United States Patent
Dormody et al.

(10) Patent No.: US 12,209,924 B2
(45) Date of Patent: *Jan. 28, 2025

(54) CONSTRAINING BAROMETRIC PRESSURE SENSOR CALIBRATION WITH SPORADIC DATA COLLECTION

(71) Applicant: NextNav, LLC, Sunnyvale, CA (US)

(72) Inventors: Michael Dormody, San Jose, CA (US); Guiyuan Han, San Jose, CA (US); Badrinath Nagarajan, Cupertino, CA (US); Arun Raghupathy, Bangalore (IN)

(73) Assignee: NextNav, LLC, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/495,124

(22) Filed: Oct. 26, 2023

(65) Prior Publication Data

US 2024/0060843 A1    Feb. 22, 2024

Related U.S. Application Data

(63) Continuation of application No. 18/157,406, filed on Jan. 20, 2023, now Pat. No. 11,841,285, which is a continuation of application No. 17/660,011, filed on Apr. 20, 2022, now Pat. No. 11,579,036, which is a continuation of application No. 17/303,691, filed on Jun. 4, 2021, now Pat. No. 11,333,567.

(60) Provisional application No. 63/037,899, filed on Jun. 11, 2020.

(51) Int. Cl.
*G01L 27/00*    (2006.01)
*G01C 5/06*    (2006.01)

(52) U.S. Cl.
CPC .............. *G01L 27/002* (2013.01); *G01C 5/06* (2013.01)

(58) Field of Classification Search
None
See application file for complete search history.

(56) References Cited

U.S. PATENT DOCUMENTS

| 4,431,994 | A | 2/1984 | Gemin |
| 2008/0202234 | A1 | 8/2008 | O'Neill |
| 2015/0127287 | A1 | 5/2015 | Wolf et al. |
| 2016/0033286 | A1 | 2/2016 | Gemelli |
| 2016/0245716 | A1 | 8/2016 | Gum et al. |
| 2018/0031388 | A1 | 2/2018 | Gunnarsson et al. |

(Continued)

FOREIGN PATENT DOCUMENTS

KR    20170082006 A    7/2017

OTHER PUBLICATIONS

International Search Report and Written Opinion dated Sep. 10, 2021 for PCT Patent Application No. PCT/IB2021/054933.

(Continued)

*Primary Examiner* — Lina Cordero
(74) *Attorney, Agent, or Firm* — MLO, a professional corp.

(57) ABSTRACT

Multiple calibration results for calibrating a barometric pressure sensor based on data received from a device containing the sensor are determined and stored in a table. The table is updated based on rules regarding a relationship between each calibration result and a current calibration value. The calibration results are weighted and combined to determine a combined calibration result. The calibration value for calibrating the sensor is selected from the calibration results, the combined calibration results, or the current calibration value based on a selection criteria.

30 Claims, 13 Drawing Sheets

(56) References Cited

U.S. PATENT DOCUMENTS

| | | |
|---|---|---|
| 2018/0094998 A1 | 4/2018 | Youssef et al. |
| 2018/0246255 A1 | 8/2018 | Springer |
| 2019/0094379 A1 | 3/2019 | Chhokra et al. |
| 2019/0360804 A1 | 11/2019 | Dormody et al. |
| 2019/0360886 A1 | 11/2019 | Dormody et al. |
| 2020/0217659 A1 | 7/2020 | Masuike et al. |
| 2021/0356347 A1 | 11/2021 | Dormody et al. |

OTHER PUBLICATIONS

Notice of Allowance and Fees dated Aug. 9, 2023 for U.S. Appl. No. 18/157,406.

Notice of Allowance and Fees dated Jan. 27, 2022 for U.S. Appl. No. 17/303,691.

Notice of Allowance and Fees dated Oct. 26, 2022 for U.S. Appl. No. 17/660,011.

Office Action dated May 10, 2023 for U.S. Appl. No. 18/157,406.

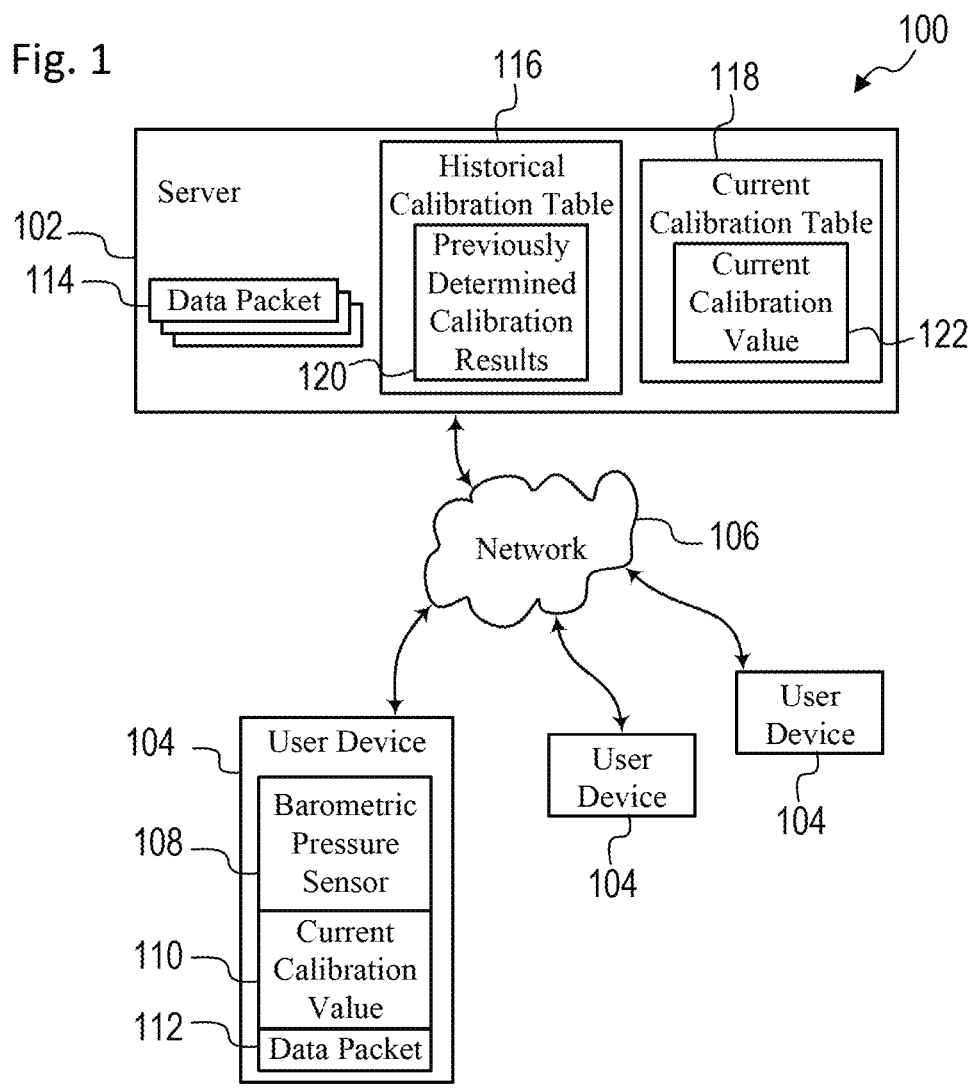

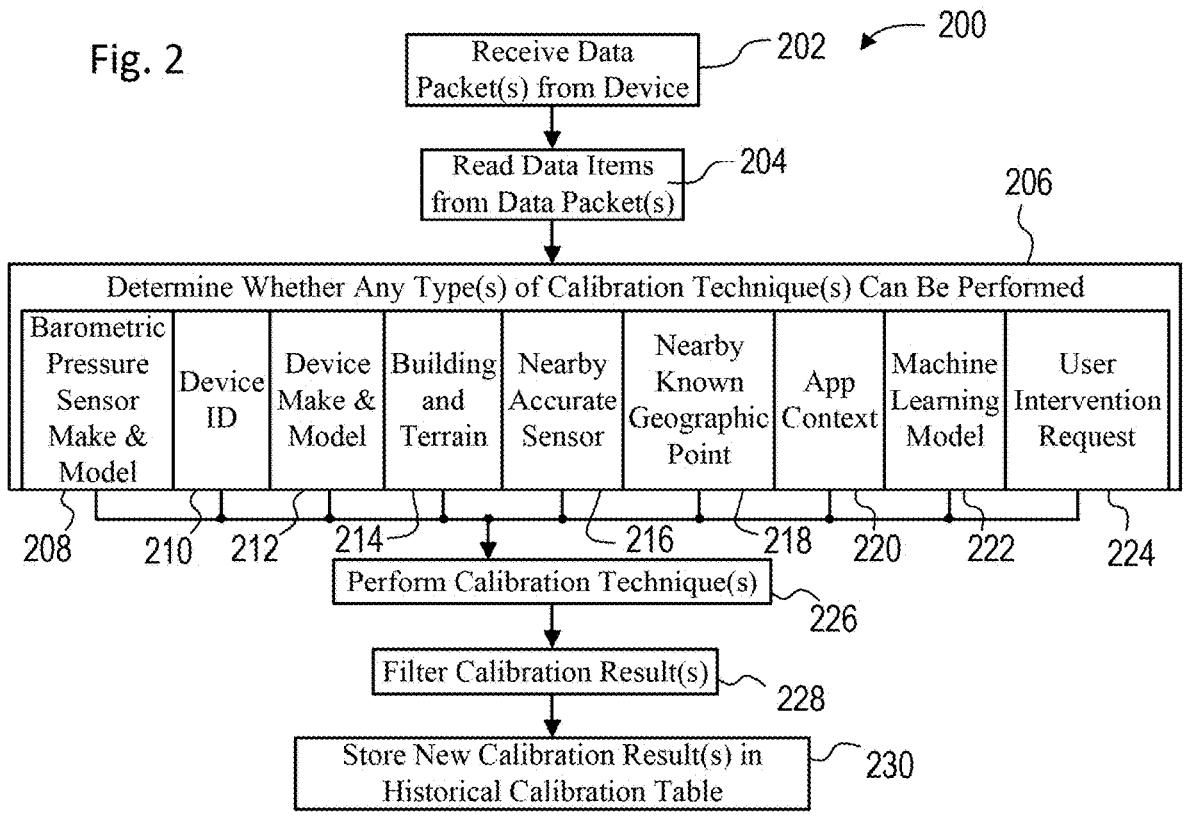
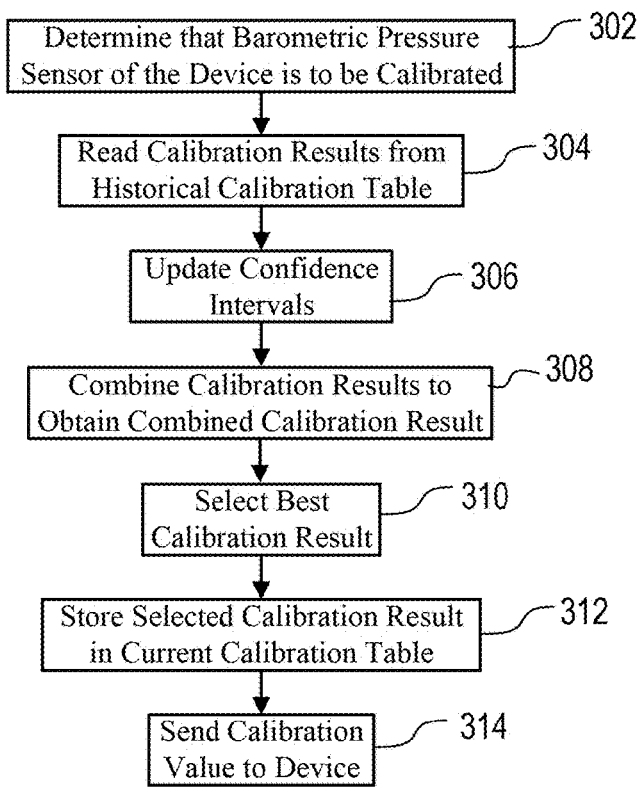

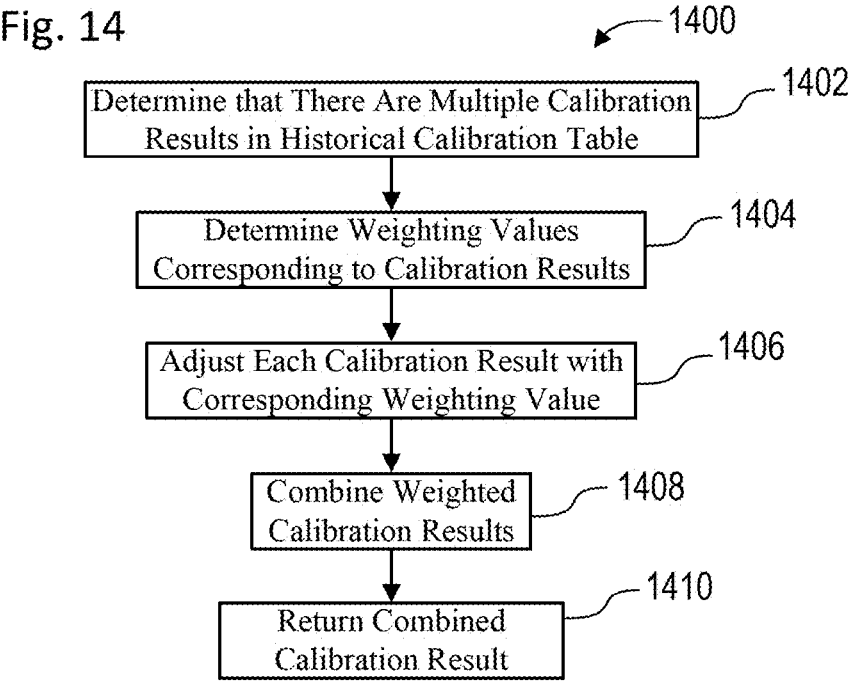
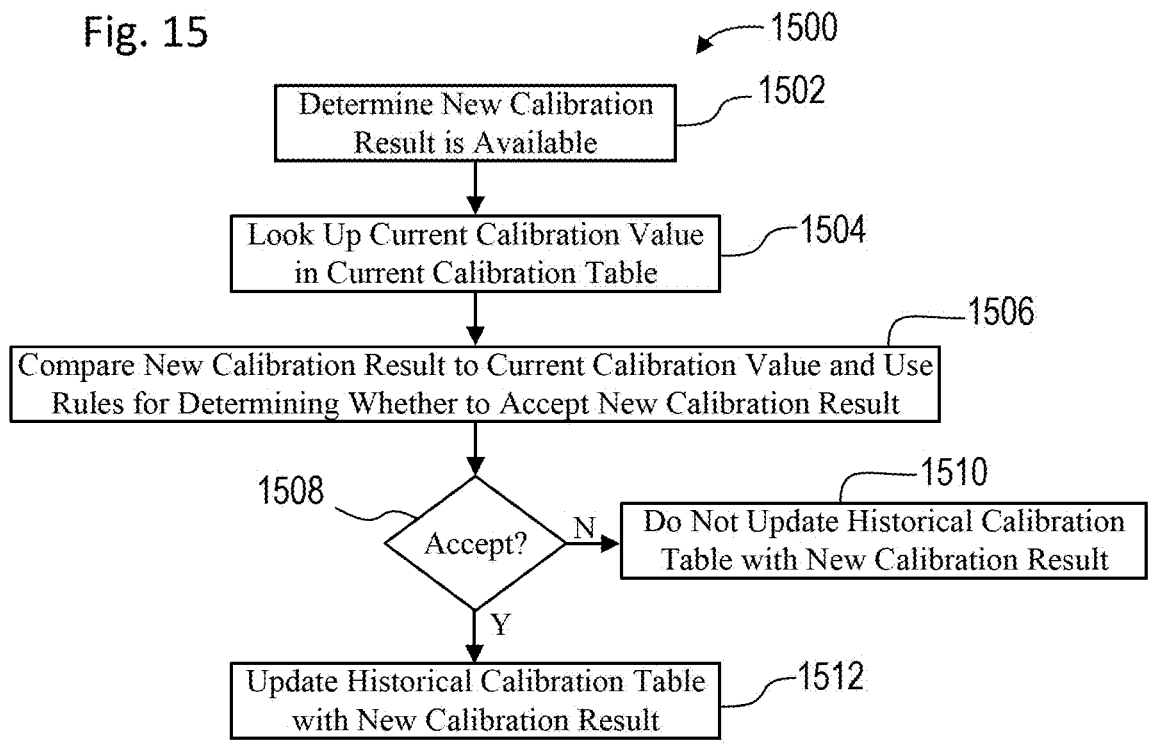

CONSTRAINING BAROMETRIC PRESSURE SENSOR CALIBRATION WITH SPORADIC DATA COLLECTION

RELATED APPLICATIONS

This application is a continuation of U.S. patent application Ser. No. 18/157,406, filed on Jan. 20, 2023, which is a continuation of U.S. patent application Ser. No. 17/660,011, filed on Apr. 20, 2022, which is a continuation of U.S. patent application Ser. No. 17/303,691, filed on Jun. 4, 2021, which claims priority to U.S. Provisional Patent Application No. 63/037,899, filed on Jun. 11, 2020, and entitled, "Constraining Baro Calibration through Sporadic Data Collection", all of which is hereby incorporated by reference in its entirety and for all purposes.

BACKGROUND

Some mobile devices are part of systems that determine altitude of the mobile devices based on barometric pressure. Such systems necessarily rely on a well-calibrated barometric pressure sensor within the mobile device.

Under ideal conditions, the barometric pressure sensor would already be well-calibrated when the mobile device left the factory. Alternatively, the user of the mobile device would follow instructions on how to calibrate the barometric pressure sensor of the mobile device.

Unfortunately, most consumer-grade barometric pressure sensors are not well-calibrated, and the willingness or ability of most users to calibrate the barometric pressure sensor of their mobile device is unknown or unreliable. Furthermore, even if the barometric pressure sensor is accurately calibrated at one time, the calibration may drift over time, thereby becoming poorly calibrated and rendering the altitude determination capabilities of the mobile device inaccurate, unreliable, or useless.

Therefore, it is necessary for the mobile device to communicate with a system with which to calibrate its barometric pressure sensor. This calibration typically is accomplished automatically, i.e., without the user's intervention or knowledge. However, the accuracy of the calibrations by such a calibration system may be questionable if the calibration techniques used thereby are insufficiently adapted to the types of situations which the user and the mobile device might encounter.

SUMMARY

In some embodiments, a method performed by a server includes:
  receiving a data packet from a device;
  determining a plurality of calibration results based on data in the data packet, each of the plurality of calibration results being for calibration of a barometric pressure sensor of the device, the device currently using a current calibration value for calibration of the barometric pressure sensor;
  for each calibration result of the plurality of calibration results, updating, by the server, a historical calibration table with the calibration result when a comparison of the calibration result with the current calibration value indicates that the calibration result satisfies a rule with respect to a relationship between the calibration result and the current calibration value, the historical calibration table containing a plurality of previously determined calibration results for the barometric pressure sensor, the plurality of previously determined calibration results including the calibration result after updating the historical calibration table;
  for each calibration result of the plurality of calibration results, not updating the historical calibration table with the calibration result when the comparison of the calibration result with the current calibration value indicates that the calibration result does not satisfy the rule;
  determining, by the server, a plurality of weighting values corresponding to the plurality of previously determined calibration results in the historical calibration table;
  determining, by the server, a combined calibration result by adjusting each calibration result of the plurality of previously determined calibration results with a corresponding weighting value of the plurality of weighting values to obtain a plurality of weighted calibration results and combining the plurality of weighted calibration results;
  selecting, by the server, a selected calibration value from the combined calibration result and the current calibration value based on a selection criteria; and
  transmitting, by the server to the device, the selected calibration value for use by the device in calibrating the barometric pressure sensor.

In some embodiments, each calibration result and each calibration value includes a calibration offset and a confidence interval (providing a potential error range), and the above rule is based on a relationship between the calibration offset, the confidence interval, or the potential error range of the calibration result and the current calibration value.

In some embodiments, the server adjusts the plurality of previously determined calibration results based on their respective ages to obtain a plurality of adjusted previously determined calibration results; and the server uses the plurality of adjusted previously determined calibration values results to determine the combined calibration value.

In some embodiments, the selection criteria is based on 1) a smallest uncertainty of the combined calibration result and the current calibration value, 2) the smallest uncertainty of the combined calibration result and the current calibration value that is less than an uncertainty threshold value, 3) a highest priority calibration technique of a plurality of calibration techniques used to determine the combined calibration result and the current calibration value, or 4) a median calibration value of the combined calibration result and the current calibration value.

In some embodiments, the data in the data packet includes a plurality of data items; the plurality of data items is used in a plurality of calibration techniques for determining the plurality of calibration results; each calibration result of the plurality of calibration results is determined by one of the calibration techniques; the plurality of data items includes 1) sensor characteristic data related to the barometric pressure sensor, and 2) current condition data related to conditions of the device at a time that the data packet was prepared by the device; the sensor characteristic data includes 1) device identification data that uniquely identifies the device and with which a model type of the barometric pressure sensor can be identified, 2) sensor type data that identifies the model type of the barometric pressure sensor, and 3) device type data that identifies a model type of the device; the current condition data includes 1) pressure data indicative of a barometric pressure measurement performed by the barometric pressure sensor, 2) time data indicative of a time at which the barometric pressure sensor performed the barometric pressure measurement, 3) location data indicative of an area within which the device was located when the barometric pressure sensor performed the barometric pressure measurement, and 4) application data indicative of an application that was operative on the device when the barometric pressure sensor performed the barometric pressure measurement; and the method further comprises determining the calibration results based on any appropriate or useful combination of the data items with other appropriate data.

In some embodiments, the method is performed using more than one data packet.

In some embodiments, a system performs the method, or a non-transitory machine-readable media embodies program instructions for performing the method.

BRIEF DESCRIPTION OF THE DRAWINGS

FIG. 1 is a simplified schematic diagram of an example calibration system for calibrating a barometric pressure sensor in a user's device, in accordance with some embodiments.

FIG. 2 is a simplified flowchart of an example process by the calibration system shown in FIG. 1 for performing calibration techniques and processing the results thereof, in accordance with some embodiments.

FIG. 3 is a simplified flowchart of an example process by the calibration system shown in FIG. 1 for updating the calibration of the barometric pressure sensor in the user's device, in accordance with some embodiments.

FIG. 14 is a simplified flowchart of an example process by the calibration system shown in FIG. 1 for combining the results of multiple calibration techniques, in accordance with some embodiments.

FIG. 15 is a simplified flowchart of an example process by the calibration system shown in FIG. 1 for updating an historical calibration table with a new calibration result, in accordance with some embodiments.

DETAILED DESCRIPTION

Figure 4:
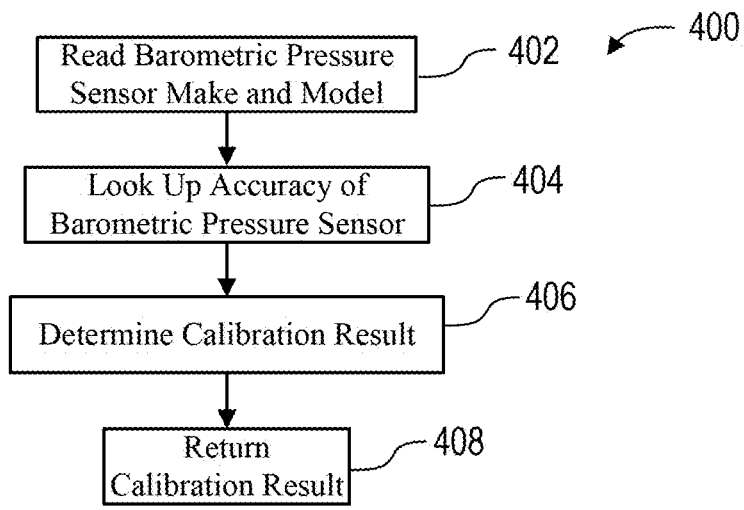
FIG. 4 is a simplified flowchart of an example process by the calibration system shown in FIG. 1 for performing a calibration technique, in accordance with some embodiments.

A calibration system or method of calibration described herein enables calibrations of a barometric pressure sensor of a mobile or user device with several calibration techniques which take into consideration a wide variety of potential situations which the user device and the user thereof might encounter. The combination of the calibration techniques and the analysis of the results thereof provides for a relatively accurate calibration of the barometric pressure sensor, thereby resulting in relatively accurate and reliable altitude determinations by the user device.

In some embodiments, the calibration system calibrates the barometric pressure sensor at sporadic times under less-than-ideal conditions. When calibration data is available, the calibration system inspects and processes the available calibration data, performs whichever calibration techniques are enabled by the calibration data, combines the results of the calibration techniques to arrive at a new calibration value, determines the quality or confidence of the new calibration value, determines whether to accept or reject the new calibration value, and determines whether to update the user device with the new calibration value.

Advantages of the present invention include that it allows a barometric pressure sensor to be calibrated with minimal data across a variety of environments. Additionally, the calibration system and method requires little to no user intervention, provided the resulting calibration value is associated with a good confidence. Additionally, when user intervention is requested or required, the calibration system allows for user freedom to pick a location and can handle indoor locations on upper floors of buildings. Furthermore, the present invention minimizes any disruption to the user and provides a seamless, automated method to calibrate barometric pressure sensors. In addition, minimal data used for calibration can aid in reducing power consumption by the user device or alleviate privacy concerns.

FIG. 1 is a simplified schematic diagram of an example calibration system 100 for calibrating a barometric pressure sensor in a user's device, in accordance with some embodiments. In some embodiments, the calibration system 100 generally includes a server 102 and several mobile or user devices 104. The server 102 generally communicates with the user devices 104 through a network 106. The server 102 generally represents one or more computerized devices, such as a cloud computing system, a server farm, a set of computers, a desktop computer, a notebook computer, among others. The user devices 104 each generally represent a smart phone, a cell phone, a personal computer, etc. The network 106 generally represents any appropriate combination of the Internet, cell phone communication systems, broadband cellular networks, wide area networks (WANs), local area networks (LANs), wireless networks, networks based on the IEEE 802.11 family of standards (Wi-Fi networks), and other data communication networks.

In some embodiments, each user device 104 generally includes a barometric pressure sensor 108, a current calibration value 110, and a data packet 112, among other hardware, software and data. The barometric pressure sensor 108 generates a pressure measurement with which the user device 104 determines its altitude. The current calibration value 110 is used by the user device 104 or the barometric pressure sensor 108 to calibrate the barometric pressure sensor 108, i.e., to adjust the raw pressure measurement to obtain a more accurate adjusted pressure measurement with which to determine the altitude. The data packet 112 contains calibration data that the user device 104 gathers for sending to the server 102 for the server 102 to determine and return the current calibration value 110 as described below.

In some embodiments, the server 102 generally contains data packets 114 (corresponding to the data packets 112) received from each of the user devices 104, a historical calibration table 116 for each of the user devices 104, and a current calibration table 118 for each of the user devices 104, among other hardware, software and data. For each user device 104, the server 102 maintains one or more of the data packets 114 that contain recent unexpired calibration data. The server 102 may delete data packets that contain calibration data that are considered unreliable for being too old and have thus expired. With the calibration data in the one or more data packet 114 from one of the user devices 104, the server 102 performs one or more of a variety of calibration techniques with which to determine calibration values as described below for that user device 104. The server 102 stores the calibration values in the historical calibration table 116. The historical calibration table 116 contains previously determined calibration results 120 that have not expired, i.e., are considered to be still useable, for the corresponding user device 104. As described below, the server 102 selects a calibration value from among, or generates a calibration value based on, the previously determined calibration results 120 and stores the selected or generated calibration value in the current calibration table 118. The current calibration table 118, thus, contains the selected or generated calibration value as a current calibration value 122, which is generally considered to be the current best available calibration value. The server 102 sends the current calibration value 122 (i.e., the selected or generated calibration value) to the user device 104 for use as the current calibration value 110 to calibrate the barometric pressure sensor 108. For alternative embodiments, variations on the above-described functions are described below.

FIG. 2 shows a simplified flowchart of an example process 200 by the calibration system 100 for performing calibration techniques and processing the results thereof, in accordance with some embodiments. The particular steps, combination of steps, and order of the steps for this process (and other processes disclosed herein) are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps.

At 202, the server 102 receives and stores one or more data packets 114 (at one or more times) from the user device 104. (The receipt of any data packet 114 generally triggers performance of the example process 200.) In some embodiments, the calibration techniques described herein can be used with the calibration data from just one data packet 114 received from the user device 104 or with the calibration data from multiple data packets 114 received at different times. Additionally, the server 102 might receive a new one of the data packets 114 from the user device 104 at any unscheduled sporadic time, as well as at regular intervals. The user device 104 typically sends the data packet 112 to the server 102 whenever new data becomes available or the user device 104 determines that its location is within a threshold distance of a point, object or device with a known accurate altitude or pressure measurement that can be used in a calibration, as described below.

An example set of the calibration data of the data packets 114 includes multiple data items, such as:
1) sensor make and model information of the barometric pressure sensor 108 in the user device 104;
2) a unique device identification (ID) of the user device 104;
3) device make and model information of the user device 104;
4) a timestamp (time data) for a pressure measurement made by the barometric pressure sensor 108;
5) a location (location data) of the user device 104 at the time the pressure measurement was made;
6) a pressure value (pressure data) for the pressure measurement;
7) a list of apps (app data) running on the user device 104; and
8) wireless data from wireless devices (e.g., Wi-Fi device, Bluetooth beacon, etc. that broadcast a Z-position, etc.) within range of the user device 104.

The data items 1-3 are referred to as "sensor characteristic data" since they are used to determine a basic characteristic of the sensor that does not usually change. For example, a designer, manufacturer or seller of a given make and model of barometric pressure sensor can publish (e.g., in a product datasheet) an empirically determined calibration value that is applicable to all barometric pressure sensors of the same model. Additionally, the make and model of the barometric pressure sensor in the user device 104 can potentially be determined based on the unique device ID or make/model of the user device 104. Similarly, a calibration value that is applicable to the barometric pressure sensor 108 in all user devices 104 of the same make/model can be empirically determined by measuring the accuracy of the pressure measurements of a large batch of the user devices 104 with identical make/models and calculating the distribution of the accuracy of the barometric pressure sensors therein. Therefore, with any of the data items 1-3, the empirically determined calibration value for the barometric pressure sensor 108 or for the user device 104 (and by implication, for the barometric pressure sensor 108 therein) can be determined. The calibration value obtained in this manner would generally be empirically determined only once, so this calibration value may be considered to be a static, or unchanging, characteristic of the barometric pressure sensor 108 or the user device 104.

On the other hand, the data items 4-8 are referred to as "current condition data" since they are related to specific current conditions of the user device 104 or the barometric pressure sensor 108 that can change. For example, as the user moves with user device 104 during any given day, the time, location, pressure measurement, running apps, and nearby Wi-Fi devices would be constantly changing. Thus, calibration values obtained with any of these data items would be dependent on current conditions of the user device 104 and the barometric pressure sensor 108 at the time and location that each of the data items of the calibration data is obtained.

Each calibration technique described herein uses only a subset of the data items in the one or more data packets 114. Additionally, some of the data packets 114 might not include every type of data item. (Missing data items may be indicated by a null or dummy value.) Therefore, after the server 102 reads (at 204) the data items from the one or more data packets 114, the server 102 determines (at 206) whether any of the types of calibration techniques can be performed with the available data items. The calibration techniques generally include a "barometric pressure sensor make and model" calibration technique 208, a "device ID" calibration technique 210, a "device make and model" calibration technique 212, a "building and terrain" calibration technique 214, a "nearby accurate sensor" calibration technique 216, a "nearby known geographic point" calibration technique 218, an "app context" calibration technique 220, a "machine learning model" calibration technique 222, and a "user intervention request" calibration technique 224. (Each calibration technique is described in more detail below.) Therefore, at 206, the server 102 selects one or more of these calibration techniques to be performed based on the available data items in the one or more data packets 114.

Since this disclosure generally describes automatic calibration techniques, the user intervention request calibration technique 224 is a special case that may be performed, for example, if the other available calibration techniques yield calibration values with confidences that are not desired (i.e., not accurate enough) or would not be available quickly enough (i.e., needed immediately by the user). In such situations, the server 102 sends a request to the user device 104 for the user to manually enter the calibration value into the user device 104, which is then used going forward in the barometric altitude determination. Additionally, the user could be requested to manually calibrate the user device 104 if the existing calibrations are of poor quality because their confidence intervals (described below) are all above a predetermined threshold N that is set by either the server 102 or is user-configurable, or there are no available calibration values due to lack of useable calibration data, or enough time has passed that previous calibration values are inaccurate due to sensor drift.

In some embodiments of the user intervention request calibration technique 224, the user is requested to input (and the user device 104 receives and sends to the server 102) their position, either by entering their latitude and longitude, their address (which can be reverse geocoded to determine latitude and longitude), or a pin drop on a displayed map (which can be mapped to a latitude and longitude), etc. In some embodiments, the altitude of the manually entered user position can be determined using one or more of the other calibration techniques that use location data, as described below, but with a highly accurate location provided by the user, instead of a potentially less accurate location provided by the user device 104. Thus, the user intervention request calibration technique 224 can be performed in cooperation with some of the other calibration techniques to manually determine some of the calibration data. However, if the server 102 determines that manually entered calibration data, such as the location data, is not suitable for calibration (e.g., the pin drop is over water, the pin drop is on a very sloped hill, the pin drop is on a building where the number of floors and/or building height is unknown), then the user intervention request calibration technique can be aborted or denied, since the resulting altitude might be unreliable.

As an example, if the manually entered location is determined to be inside a building (e.g., based on falling within a building polygon, determined to be inside based on being near a building and GNSS signal strength or other I/O methods, etc.), then the server 102 can prompt the user device 104 to request that the user input their floor number/label. Upon receiving the floor number, the server 102 can map it to an absolute altitude using a building database that contains floor altitudes, or a building database with a building height (i.e., height of roof) and an estimated number of floors, or a building database with an estimated number of floors and an assumption about floor separation, or a building database with a building height and an assumption about floor separation. The server 102 will translate, if needed, between floor number and floor label (e.g., in areas where Ground level and 1st floor are synonymous compared with areas where 1st floor is one floor above Ground level, where the 13th floor label is purposely skipped, where floor labels containing the number 4 are purposely skipped, etc.).

The confidence interval for the user intervention request calibration technique 224 would depend on one or more of a variety of considerations, depending on how the user input is used, such as 1) the accuracy of a reference network of known accurate sensors, 2) a distance to the network reference nodes, 3) the accuracy of the manually entered 2D location, 4) the accuracy of a terrain/(Point of Interest)/building database, 5) variation of the terrain within the user's location confidence circle, and 6) the accuracy of the floor level determination, among other considerations.

At 226, the server 102 performs the selected calibration techniques 208-224, which are described in more detail below with respect to FIGS. 4-13. Each calibration technique 208-224 generates a new "calibration result". At 228, the server 102 optionally filters the new calibrations result(s) by determining whether the new calibration result(s) is acceptable relative to the current calibration value 122, as described in more detail below with respect to FIG. 15. If the new calibration result(s) is acceptable at 228, the server 102 stores (at 230, or 1512 below) the new calibration result(s) as part of the previously determined calibration results 120 in the historical calibration table 116. As an alternative, the server 102 simply stores (at 230) all calibration results in the historical calibration table 116 without the filtering at 228. (Each calibration result and calibration value has a form of A+/−B, where A is a "calibration offset", and B is a "confidence interval" or "calibration confidence", as described below. Additionally, the calibration offset can have a positive or negative value, which can be, depending on a +/− sign convention, added to or subtracted from a "measured pressure value" produced by the barometric pressure sensor 108 to generate a "calibrated pressure value".) Each previously determined calibration result 120 is stored in the historical calibration table 116 with the following information: 1) a timestamp (e.g., for the time at which measurements were made or collected for the calibration data used to generate the calibration result), 2) the calibration offset, 3) the confidence interval, 4) the calibration technique used to generate the calibration result, and 5) whether the calibration result is a combined calibration result (described below). When an individual calibration result in the historical calibration table 116 has become too old, e.g., has expired after a predetermined period of time (e.g., one month), that calibration result could be deleted from the historical calibration table 116.

The calibration offset is an amount by which the measured pressure value produced by the barometric pressure sensor 108 is altered, or offset, to generate the calibrated pressure value, which is expected to be substantially close to an "actual barometric pressure" at the barometric pressure sensor 108. The confidence interval, when applied to the calibration offset, provides a "potential error range" (e.g., error bars) below and above the calibration offset of the calibration result or the calibration value. When applied to the calibrated pressure value, the confidence interval is a range greater than and less than the calibrated pressure value that the actual barometric pressure is expected to be within. Thus, the phrase "confidence interval" generally means the range of values that it is relatively certain that the calibration is actually falling within, out to a given percentage confidence level. A smaller range of values, for example, indicates a greater "confidence" in the calibration. As an example, for a calibration result or calibration value of 100+/50 Pa, where the confidence is measured to be 1 sigma standard deviation (68%), this means that there is a 68% confidence level that the calibration would fall within the range between 50 and 150 Pa. (Other percent confidence levels may alternatively be used.) For figures with error bars, the confidence interval would be half the length of the entire error bar, so in this example, the error bar would be 150−50=100 Pa long. Additionally, the phrases "confidence interval", "calibration confidence", "calibration uncertainty", and "confidence value" may be used interchangeably herein or in the industry. However, a high "confidence" in a calibration result or calibration value generally corresponds to a small "confidence interval", and a low "confidence" in a calibration result or calibration value generally corresponds to a large "confidence interval". Furthermore, "confidence" is a general term used herein to refer to an overall confidence in the calibration result or calibration value, which is based on the confidence interval, the percentage confidence level, and an understanding of the relative likelihood that one calibration technique may be better than another.

The calibrated pressure value is typically used to determine the calculated altitude of the user device 104. The confidence interval is used to determine a range below and above the calculated altitude that the actual altitude is expected to be within to the percentage confidence level.

FIG. 3 shows a simplified flowchart of an example process 300 by the calibration system 100 for updating the calibration of the barometric pressure sensor 108 in the user device 104, in accordance with some embodiments. At 302, the server 102 determines that it is time to calibrate the barometric pressure sensor 108 of the user device 104. This determination might be triggered after a predetermined amount of time has passed since the previous time that the barometric pressure sensor 108 was calibrated or updated (e.g., 1 or 2 days or several hours, i.e., sufficient time for the current calibration value to have become unreliable). Alternatively, the determination at 302 might occur when a new calibration result has been added to the historical calibration table 116, thereby making it desirable to ensure that the best of the previously determined calibration results 120 (including the new calibration result and the current calibration value, among any available or unexpired other calibration results) is used as the current calibration value.

At 304, therefore, the server 102 reads the previously determined calibration results 120 from the historical calibration table 116. If there is only one previously determined calibration result 120, then the process 300 can branch from this point to 312.

At 306, the server 102 updates the confidence intervals of the previously determined calibration results 120 in the historical calibration table 116. In some embodiments, the server adjusts the previously determined calibration results 120 based on their respective ages to obtain "adjusted previously determined calibration results". This update generally increases the value of each confidence interval to produce an "adjusted confidence interval" based on a time difference between a present time (i.e., when the process 300 or the step 306 is being performed) and the time indicated by the timestamp in the historical calibration table 116 for the previously determined calibration result 120. In some embodiments, the update at 306 is performed only for the previously determined calibration results 120 that resulted from the calibration techniques 214-224 that used any of the current condition data, and not for the previously determined calibration results 120 that resulted from the calibration techniques 208-212 that used only the sensor characteristic data. This is because the calibration techniques 214-224 (which rely on measured calibration data from the barometric pressure sensor 108) can be prone to sensor drift, so the calibration techniques 214-224 may be less accurate as time increases. Such "aging" increases the uncertainty of the calibration results resulting from the calibration techniques 214-224, so the confidence interval is increased accordingly. In other embodiments, the update at 306 is performed for all of the previously determined calibration results 120, regardless of the calibration technique used to produce them, in a situation in which the barometric pressure sensor 108 exhibits linear or non-oscillatory drift. The aging factor can be linear (e.g. a predetermined constant number for each day of age, e.g., 10 Pa/day), decaying exponential (e.g. a first predetermined number for the first day, a second smaller predetermined number for the second day, a third still-smaller number for the third day, and so on, e.g., 10 Pa for the first day, 8 Pa more for the second day, etc.), or asymptotic (e.g. 10 Pa for first day, 5 Pa more for second day, topping out at 30 Pa total), among other aging techniques. The server 102 also (at 306) may delete any calibration result from the historical calibration table 116 for which the adjusted confidence interval has become too large or that has become too old, e.g., has expired after a predetermined period of time (e.g., one month).

In some embodiments, at 308, the server 102 combines the calibration results of each of the previously determined calibration results 120 or of the adjusted previously determined calibration results (or selects from among the calibration results thereof) to obtain a "combined calibration result" (as described in more detail below with respect to FIG. 14), which can be used in place of or as one of the previously determined calibration results 120 or the adjusted previously determined calibration results. At 310, the server 102 selects a best calibration result (a.k.a. a selected calibration result) from the previously determined calibration results (as adjusted, combined, or updated above) based on a selection criteria. (In some embodiments, the selection is between the combined calibration result and the current calibration value. In some embodiments, the selection is between every one of the previously determined calibration results 120 in the historical calibration table 116, which further includes the current calibration value and optionally includes the combined calibration result.) The selection criteria may be based on any appropriate criteria found to be relevant, such as 1) a smallest uncertainty (confidence interval) in the (adjusted) previously determined calibration results, 2) the smallest uncertainty (confidence intervals) in the (adjusted) previously determined calibration results that is less than a maximum uncertainty threshold value (e.g. only those with confidence intervals<=50 Pa), 3) a highest priority calibration technique of the calibration techniques 208-224 used to determine the (adjusted) previously determined calibration results, or 4) a median calibration value of the (adjusted) previously determined calibration results. For an example of the priority of techniques, if there are previously determined calibration results 120 that resulted from a user intervention request calibration technique 224, a device make and model calibration technique 212, and an app context calibration technique 220, and if the user intervention request calibration technique 224 has been prioritized above the others, then the server 102 selects the previously determined calibration results 120 that resulted from the user intervention request calibration technique 224. Additionally, in addition to performing the filtering process 1500 at 228 above, or if the server 102 did not filter the new calibration results at 228 before storing them in the historical calibration table at 230 or 1512, then the filtering process 1500 can be used on the selected calibration result subsequent to the selection of the best calibration result at 310. In this case, a determination is made whether to update the current calibration table 118 at 1508-1512 or 312, rather than the historical calibration table 116.

If there is a selected calibration result based on the above criteria, then the server 102 stores (at 312) the selected calibration result as the current calibration value in the current calibration table 118 corresponding to the user device 104 to indicate that this value is the current calibration value 122 for the user device 104. (If no selected calibration result is produced at 310, then the current calibration table 118 is not updated.) Additionally, the server 102 sends (at 314) the selected or current calibration value 122 to the user device 104. The user device 104 receives and stores the current calibration value 122 as its current calibration value 110 for use in calibrating the barometric pressure sensor 108.

In some alternative embodiments, the server 102 does not use the historical calibration table 116 but simply maintains the current calibration value 122 for the user device 104. In this case, the server 102 uses the selection at 228 (as described in more detail with respect to FIG. 15) to determine whether to update the current calibration value 122 with the new calibration value and to send the new calibration value to the user device 104.

The disclosure herein provides an advantage of being able to consolidate calibration results from multiple calibration techniques to produce a reliable calibration value for calibrating the barometric pressure sensor 108. The disclosure herein also provides an advantage of maintaining multiple previously determined calibration values with which to select a best calibration value.

The preceding and following description generally assumes that the server 102 performs the functions as described. However, in some alternative embodiments, the user device 104 can perform some of these functions. In this case, the user device 104 keeps its most recent data packets 112 and maintains its historical calibration table and current calibration table. The server 102 sends the additional described data to the user device 104. Then the user device 104 determines when any of the calibration techniques 208-224 is to be performed, performs the calibration techniques 208-224, combines the results thereof to obtain a new calibration value, stores the new calibration value in its historical calibration table, determines when to calibrate its barometric pressure sensor 108, selects the best previously determined calibration value from the historical calibration table, stores the selected calibration value as the current calibration value in its current calibration table, and uses the current calibration value to calibrate its barometric pressure sensor 108. Alternatively, the user device 104 performs an appropriate subset of these functions, and the server 102 performs the rest.

FIG. 4 shows a simplified flowchart of an example process 400 by the calibration system 100 for performing the barometric pressure sensor make and model calibration technique 208 when this calibration technique is selected at 206 and performed at 226 in the example process 200 of FIG. 2 above, in accordance with some embodiments. At 402, the server 102 reads the barometric pressure sensor make and model data from the data packet 114. The barometric pressure sensor make and model is generally used to compare against an expected accuracy specification. Using the make and model, therefore, the server 102 looks up (at 404) the accuracy (i.e., a predetermined calibration) of the barometric pressure sensor 108 in a lookup table, e.g., based on the product datasheet published by the designer, manufacturer or seller of the given make and model of the barometric pressure sensor 108. Thus, the server 102 looks up the calibration offset and the confidence interval in the sensor make/model lookup table. With this information, the server 102 determines (at 406) the calibration result for the barometric pressure sensor make and model calibration technique 208. For example, if the product datasheet specifies an accuracy of +/−100 Pa, then the calibration can be defined as 0 Pa with a confidence of 100 Pa. Alternatively, a large batch of barometric pressure sensors with identical sensor make/model can be independently tested for the accuracy of their pressure measurements, and the predetermined calibration can be calculated therefrom to provide the accuracy of this make/model of barometric pressure sensor. For example, if the distribution of the accuracies measured for the batch of barometric pressure sensors is −10+/−50 Pa, then the predetermined calibration in the datasheet of a barometric pressure sensor with that specific sensor make/model can be provided as −10 Pa with a confidence of 50 Pa. The server 102 returns (at 408) the calibration result to the example process 200 for further processing after 226.

Figure 5:
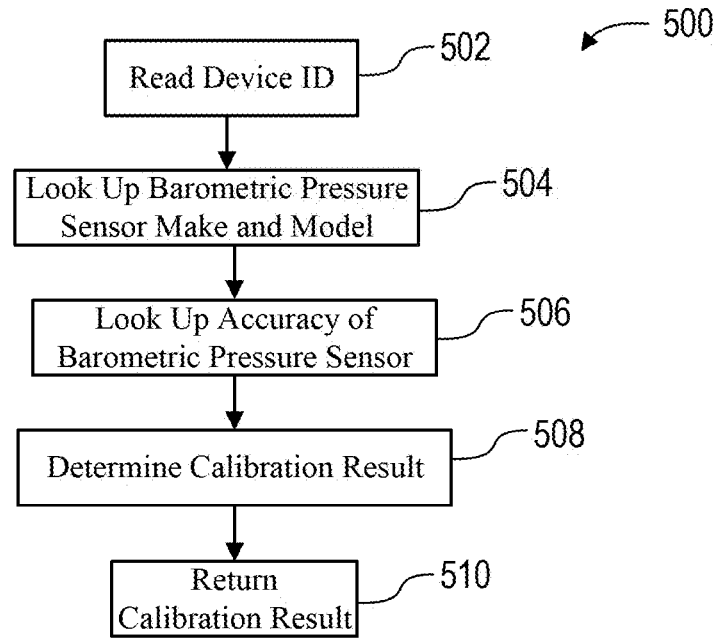
FIG. 5 is a simplified flowchart of an example process by the calibration system shown in FIG. 1 for performing another calibration technique, in accordance with some embodiments.

FIG. 5 shows a simplified flowchart of an example process 500 by the calibration system 100 for performing the device ID calibration technique 210 when this calibration technique is selected at 206 and performed at 226 in the example process 200 of FIG. 2 above, in accordance with some embodiments. At 502, the server 102 reads the unique device ID (e.g., International Mobile Equipment Identity (IMEI) number, phone number, mobile advertising ID (AD-ID), or other unique identifier) of the user device 104 in the data packet 114. Using the device ID, the server 102 looks up (at 504) the barometric pressure sensor make and model (or a unique ID for the barometric pressure sensor 108) in a lookup table. (From this point, process 500 proceeds similarly to process 400.) Using the barometric pressure sensor make and model, the server 102 looks up (at 506) the accuracy (i.e., a predetermined calibration) of the barometric pressure sensor 108 in a lookup table, e.g., based on the product datasheet published by the designer, manufacturer or seller of the given make and model of the barometric pressure sensor 108. Thus, the server 102 looks up the calibration offset and the confidence interval in the sensor make/model lookup table. With this information, the server 102 determines (at 508) the calibration result for the device ID calibration technique 210. The server 102 returns (at 510) the calibration result to the example process 200 for further processing after 226.

Figure 6:
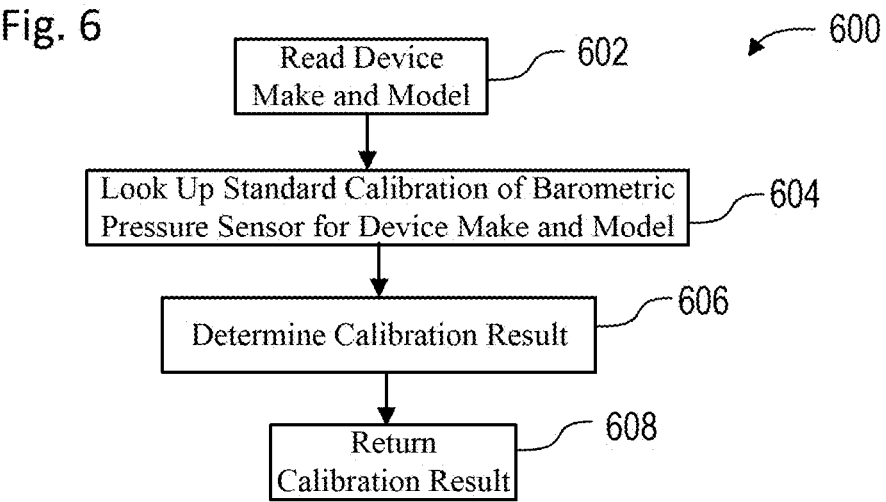
FIG. 6 is a simplified flowchart of an example process by the calibration system shown in FIG. 1 for performing another calibration technique, in accordance with some embodiments.

FIG. 6 shows a simplified flowchart of an example process 600 by the calibration system 100 for performing the device make and model calibration technique 212 when this calibration technique is selected at 206 and performed at 226 in the example process 200 of FIG. 2 above, in accordance with some embodiments. At 602, the server 102 reads the device make and model information of the user device 104 in the data packet 114. Different user devices 104 have different off-the-shelf accuracies of their barometric pressure sensors 108, with the sensors of some user devices being more accurate than others owing to the quality of the construction, assembly, location in device, etc. Thus, a large batch of user devices 104 with identical make/model can be independently tested for the accuracy of the pressure measurements of their barometric pressure sensors 108, and a predetermined calibration can be calculated therefrom to provide the accuracy of the barometric pressure sensor 108 of this make/model of user device. For example, if the distribution of the accuracies measured is −10+/−50 Pa, then the calibration of the user device 104 of that specific make/model can be defined as −10 Pa with a confidence of 50 Pa. Using the device make and model, therefore, the server 102 looks up (at 604) the accuracy (i.e., a predetermined calibration or standard calibration) of the barometric pressure sensor 108 for the user device 104 in a lookup table, e.g., based on the independent testing results. Thus, the server 102 looks up the calibration offset and the confidence interval in the device make/model lookup table. With this information, the server 102 determines (at 606) the calibration result for the device make and model calibration technique 212. The server 102 returns (at 608) the calibration result to the example process 200 for further processing after 226.

In some embodiments, since the calibration results of the calibration techniques 208-212 are generally considered to be static, i.e., unchanging, these calibration techniques need be performed only once. Thus, calibration values based on these calibration results could be maintained in the historical calibration table 116 indefinitely. Additionally, the sensor make and model information of the barometric pressure sensor 108, the unique device ID of the user device 104, and the device make and model information of the user device 104 do not all have to be included in all of the data packets 112 or 114, unless needed to identify the user device 104 to the server 102.

Figure 7:
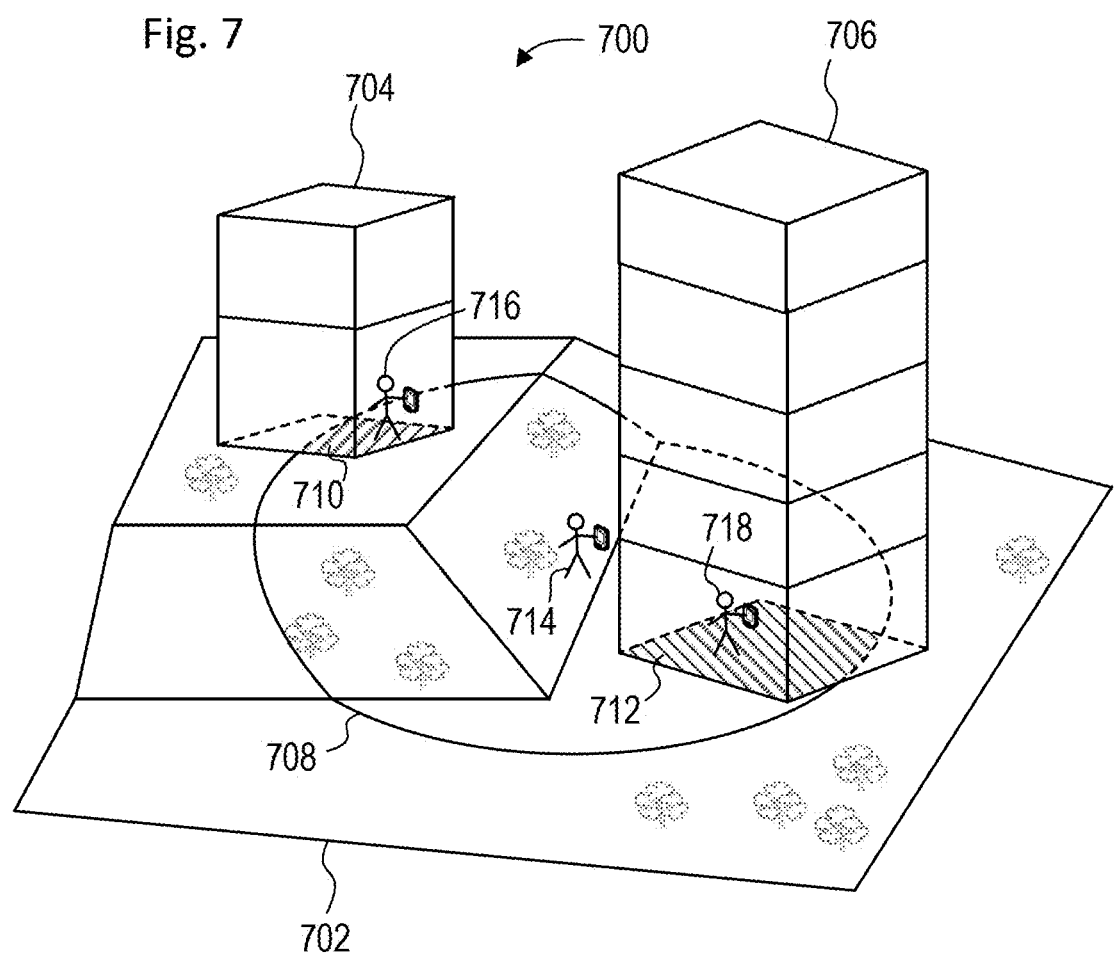
FIG. 7 is a simplified diagram of an example terrain with buildings for use in the calibration technique shown in FIG. 8, in accordance with some embodiments.

The building and terrain calibration technique 214 is described with reference to FIGS. 7-9. FIG. 7 shows a simplified diagram of an example terrain with buildings 700 for use in this calibration technique shown in FIG. 8, in accordance with some embodiments. For this example, a terrain 702 is shown as uneven with different altitudes and slopes in between, and buildings 704 and 706 have different heights, different numbers of floors, and different floor separation values. Additionally, the location data provided by the user device 104 might indicate a 2D location area 708 (user device footprint) within which the user device 104 may be. Furthermore, the 2D location area 708 includes an area outside of the buildings 704 and 706 as well as areas within the buildings 704 and 706, as indicated by shaded partially overlapping areas 710 and 712. The shaded overlapping areas 710 and 712 are applicable to each floor of the buildings 704 and 706, respectively. Thus, the user and user device 104 may be outside the buildings 704 and 706 (e.g., at 714), inside the first building 704 on any floor thereof (e.g., at 716), or inside the second building 706 on any floor thereof (e.g., at 718).

If the user device 104 happened to collect and send the data packet 112 when the altitude thereof is unambiguous (e.g., outside on flat terrain with no location area overlapping a building), then it is possible to calibrate the barometric pressure sensor 108 against a reference network of known pressure sensors. If the altitude cannot be determined unambiguously (e.g., possibly being inside a building on any floor), it is still possible to constrain the potential altitude of the user device 104 and calibrate against the potential altitudes of the floors. For example, if the user device 104 were determined to be entirely in a 3-story building, then the likely altitude is on one of three floors, and the calibration could be made to the average or median of the three floors (e.g. the second floor in the US floor labeling convention), with the confidence interval being +/−1 floor.

It is possible to determine the potential altitudes of the user device 104 as follows. For a given 2D confidence (i.e., the 2D location area 708) centered on the most likely 2D position of the user device 104, the possible 3D positions of the user device can be defined as: on the terrain outside the buildings 704 and 706 (plus some additional height held above the ground), and on any floor within either building 704 or 706 that falls within the user confidence footprint, i.e., the respective shaded overlapping areas 710 and 712, (plus some additional height held above the ground). The individual floor heights can be used if they are known a priori, or they can be estimated from the building height, the number of floors, an assumption about floor separation, or any combination of these.

If a uniform probability is assumed that the user device 104 is equally likely to be located within the 2D location area 708, including the shaded overlapping areas 710 and 712 for each floor of the respective buildings 704 and 706, then the probability distribution of the altitude of the user device 104 can be determined, including any assumed height above the ground or floor level. In a simplified example, if the terrain altitude is 0 m, the device above floor height is 1 m, the area of the confidence circle of the 2D location area is 200 m$^2$, there is only one overlapping building, there are only two floors of the overlapping building above ground, the upper floor areas are 100 m$^2$, and the upper floors are separated by 3 meters, then the probability of the user device 104 being located at 1 m is 200/(200+100+100)=0.5, the probability of the user device 104 being at 4 m is 100/(200+100+100)=0.25, and the probability of the user device 104 being at 7 m is 100/(200+100+100)=0.25. Therefore, the 90% range of likely altitude is 1 m to 7 m, and since the median of the distribution is 2.5 m, the likely altitude is 2.5 with an asymmetric altitude confidence interval of +4.5 to −1.5 m. Alternatively, we can report the likely altitude to be the middle of the confidence interval range and report 4+/−3 m. If the measured altitude due to the measured pressure of the barometric pressure sensor 108 reads 20 m, then the calibration value is 20−(4+/−3) or 16+/−3 m (or (4+/−3)−20=−16+/−3, depending on the positive/negative sign convention of the calibration definition). When converted to pressure, this means the calibration value of the barometric pressure sensor 108 is about 192+/−36 Pa (assuming 1 m~12 Pa as a typical relationship between altitude differences and pressure differences) (or −192+/−36 Pa, depending on the positive/negative sign convention of the calibration definition). The +/− errors need not be symmetrical, since the building footprint may be considerably smaller than the outdoor terrain footprint, or there are multiple other buildings within the user's confidence of varying heights and footprints. Also, the building footprint need not to entirely lie within the user device footprint, nor does the user device footprint need to entirely lie within the building footprint, since the overlapping area (whether including a partial or complete extent of either footprint) between the two is of interest. Also, the ground floor of the building 704 or 706 need not be the same height as the surrounding terrain: it could be above or below. Also, if a portion of a floor or range of floors is known to be inaccessible (e.g., a server floor, machine floor, closed for renovation, roof, etc.), these regions can be excluded in the altitude distribution of potential user device altitudes.

If the height of the overlapping building 704 or 706 were unknown, it is possible or acceptable to assume a height and a floor height separation based on morphology. For example, if the building of interest lies in a suburban area, the heights can be assumed to be 1 or 2 floors for a typical 1 or 2 story home or small business establishment. In another example, if the building of interest lies within an industrial part of town with large warehouses, the heights can be assumed to be 1 floor. Such altitudes may be less accurate, but the error can still be bound.

Figure 8:
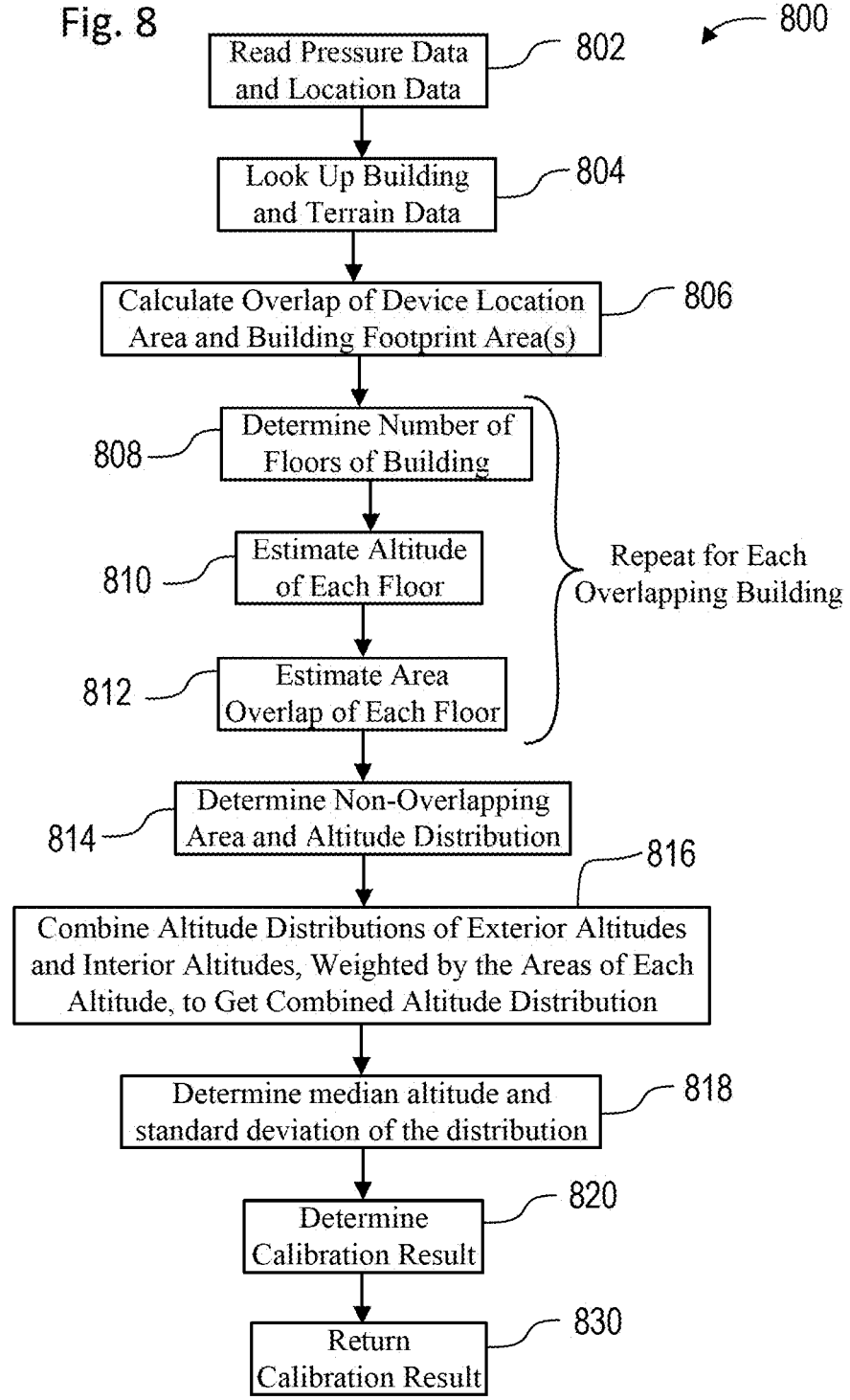
FIG. 8 is a simplified flowchart of an example process by the calibration system shown in FIG. 1 for performing another calibration technique, in accordance with some embodiments.
Figure 9:
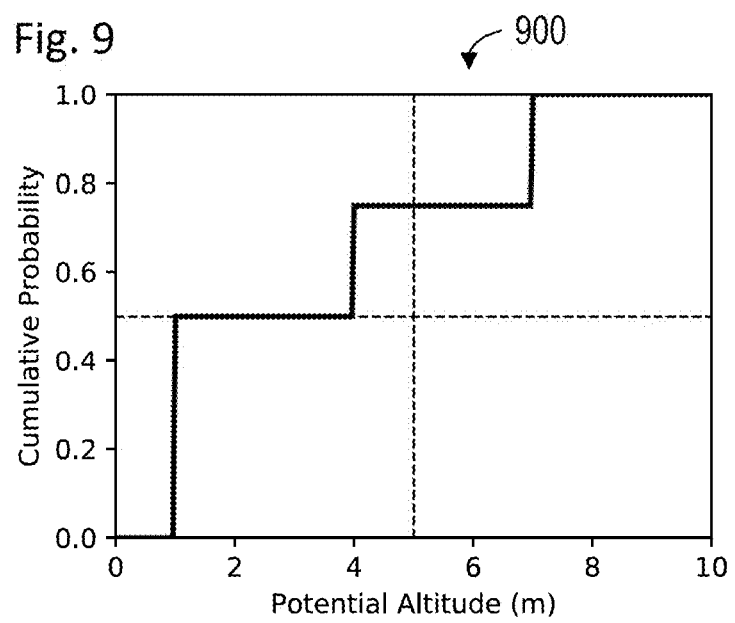
FIG. 9 is a simplified graph of an example altitude v. cumulative probability for use in the calibration technique shown in FIG. 8, in accordance with some embodiments.

In accordance with the above considerations, FIG. 8 shows a simplified flowchart of an example process 800 by the calibration system 100 for performing the building and terrain calibration technique 214, in accordance with some embodiments. At 802, the server 102 reads the pressure data and location data from the data packet 114. At 804, the server 102 looks up the building and terrain data (e.g., in a mapping database) for the 2D location area 708 indicated by the location data. At 806, the server 102 determines whether the 2D location area 708 overlaps any building, and if so, calculates (using the 2D location area 708 and the building and terrain data) the overlap (e.g., the shaded overlapping areas 710 and 712) of the user device's 2D location area 708 and the building footprint area for each building.

In some embodiments, the server 102 determines (at 808) the number of floors of the building (e.g., 704 or 706). For example, the number of floors can be determined by any appropriate or available technique, such as 1) looking up the number of floors in a database of known buildings, 2) estimating the number of floors from the height of the building (from a building database) and a reasonable floor separation value (e.g., 12 m tall building with 3 m/floor separation: 12/3=4 floors), 3) assuming the number of floors based on morphology (e.g. a suburban area typically has only 1-2 floors), etc. In some embodiments, determining (at 808) the number of floors of a building is unnecessary if the altitudes of each floor is already known (see 810 below).

In some embodiments, the server 102 estimates or calculates (at 810) the altitude of each floor. For example, each floor altitude can be determined by any appropriate or available technique, such as 1) looking the altitudes up in a building database, 2) looking up the ground height from a terrain database and adding a (floor separation value)*(floor number−1) (assuming a reasonable floor separation value and the floors start counting from 1), etc. This step may optionally exclude a particular floor number if it is known to be inaccessible. Additionally, this step may optionally add an offset to the floor altitude (e.g., 1 m) to indicate how high the user device 104 could be above the floor, since it is the altitude of the user device 104 that is of concern.

In some embodiments, the server 102 estimates or calculates (at 812) the area of overlap of each floor with the user device's 2D location area 708. This area of overlap might typically be the same as the overlap calculated at 806 for each building, unless different floors have different areas.

The process 800 repeats 808-812 for each building that overlaps the user device's 2D location area 708.

In some embodiments, the server 102 determines (at 814) the non-overlapping area (e.g., the non-shaded area of the 2D location area 708) and the altitude distribution of the non-overlapping area (based on terrain change or topography in the 2D location area 708 as indicated by the terrain database). The server 102 may also optionally add a device offset to the altitude distribution (e.g., 1 m) to indicate how high the user device might be above the ground, since it is the altitude of the user device 104 that is of concern.

In some embodiments, the server 102 combines (at 816) the altitude distributions of the exterior altitudes (outside buildings) and all interior altitudes (each floor inside buildings), weighted by the areas of each altitude, to get a combined altitude distribution that establishes the potential altitudes of the user device 104. FIG. 9 shows a simplified graph 900 of an example likely altitude v. cumulative probability that can be obtained for the combined altitude distribution at this point in the process 800. For the graph 900, a simple horizontally flat terrain, a partially overlapping three-floor building, a device offset altitude of 1 m, and a floor separation of 3 meters were assumed. Thus, the 1 m altitude added the largest portion of the cumulative probability, and the 4 m and 7 m altitudes added smaller equal-sized portions to the cumulative probability.

From the combined altitude distribution (such as that illustrated by the graph 900), the server 102 determines or calculates (at 818) a median altitude and standard deviation (or other percent confidence of interest) of the distribution by any appropriate means. At 820, the server 102 determines the calibration result of the building and terrain calibration technique 214, where the median altitude is used to calculate the calibration offset, and the standard deviation is used to calculate the confidence interval, using the typical relationship between altitude differences and pressure differences. At 830, the server 102 returns the calibration result to the example process 200 for further processing after 226.

Figure 10:
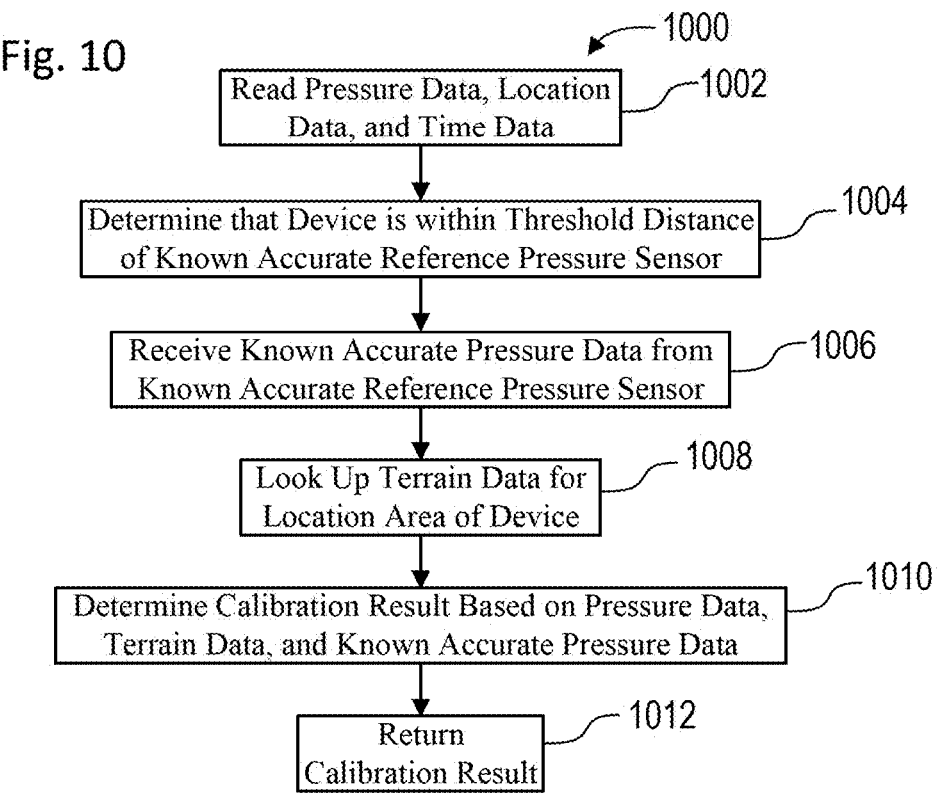
FIG. 10 is a simplified flowchart of an example process by the calibration system shown in FIG. 1 for performing another calibration technique, in accordance with some embodiments.

FIG. 10 shows a simplified flowchart of an example process 1000 by the calibration system 100 for performing the nearby accurate sensor calibration technique 216 when this calibration technique is selected at 206 and performed at 226 in the example process 200 of FIG. 2 above, in accordance with some embodiments. At 1002, the server 102 reads the pressure data, location data, and time data from the data packet 114. Using the location data, the server 102 determines (at 1004) that the user device 104 (and barometric pressure sensor 108) is within a threshold distance of a known accurate reference pressure sensor. The known accurate reference pressure sensor may be a static pressure sensor in a network of reference pressure sensors that are maintained to be highly accurate or a mobile pressure sensor of another user device 104 that was recently calibrated with a high level of confidence. Thus, the proximity of the user device 104 to the known accurate reference pressure sensor can be determined, for example, from a map or database that provides the locations of a network of reference pressure sensors or the locations of other user devices 104. In another example, proximity to another user device 104 can be determined by measuring the strength of the other user device's Bluetooth signal (if available), and if the signal strength exceeds a predetermined threshold, then the two user devices 104 can be considered to be close enough together for performing this calibration technique. At 1006, the server 102 requests and receives known accurate pressure data from the known accurate reference pressure sensor. The known accurate pressure data is time-correlated with the pressure data in the data packet 114 using the time data. At 1008, the server 102 looks up the terrain data for the location area indicated by the location data for the user device 104 and the location of the known accurate reference pressure sensor. (The terrain data may be unnecessary if the location data indicates that the user device 104 is close enough to the location of the known accurate reference pressure sensor to assume that any altitude difference is insignificant.) At 1010, the server 102 determines the calibration result for this calibration technique based on the pressure data, the terrain data (optionally), and the known accurate pressure data. The difference in pressure between the pressure data in the data packet 114 and the known accurate pressure data provides the calibration offset for the calibration result. Additionally, the terrain data in the area between or around the user device 104 and the known accurate reference pressure sensor provides a potential variation in altitude between the user device 104 and the known accurate reference pressure sensor. The variation in altitude (i.e., flatness) is used to calculate the confidence interval, based on the typical relationship between altitude differences and pressure differences. For example, if the user device 104 is determined to be within 10 m of a properly calibrated reference pressure sensor located in, perhaps, a fenced off enclosure in a city park, and if the terrain flatness metric within the 2D location area of the user device 104 is about +/−1 m 95% of the time (about +/−12 Pa in pressure difference), and if the pressure data indicates a pressure value that is about 50 Pa off the known accurate pressure data from the reference pressure sensor, then the calibration result can be defined as 50 Pa+/−12 Pa. At 1012, the server 102 returns the calibration result to the example process 200 for further processing after 226.

In an alternative calibration calculation for the nearby accurate sensor calibration technique 216, the barometric based altitude of the barometric pressure sensor 108 (or user device 104) is calculated as $H_{baro}=+/-((R*T_{reference})/(gM))*\ln(P_{reference}/P_{user})$, where g corresponds to the acceleration due to gravity (e.g., −9.8 m/s$^2$), R is a gas constant, and M is molar mass of air (e.g., dry air or other), $T_{reference}$ is a reference temperature in Kelvin at the reference pressure sensor, $P_{reference}$ is the reference pressure in Pa from the known accurate pressure data at a reference altitude (typically 0 m HAE or some other altitude), and $P_{user}$ is the pressure at the barometric pressure sensor 108 from the pressure data in the data packet 114. The "+/−" is the sign convention depending on whether g is defined as 9.8 or −9.8. The confidence in the altitude ($dH_{baro}$) for the barometric pressure sensor 108 is determined as described in co-assigned U.S. Pat. No. 10,655,961. A true altitude (or estimated true altitude) of the barometric pressure sensor 108 is determined by any appropriate method, such as the location indicated in the location data in relationship to a known accurate altitude determined from a map, a database, a nearby POI (Point of Interest of known altitude), etc. A true altitude confidence ($dH_{true}$) is determined based on the underlying accuracy of the method for determining the true altitude and the accuracy and terrain variation of the 2D location area of the user device 104. The server 102 then adjusts the user device pressure $P_{user}$ by a pressure difference value dP in the above formula in order to cause the barometric based altitude and the true altitude to be equal. The pressure difference value dP is then the calibration offset for the calibration result. The confidence interval is calculated as the square root of the sum of $dH_{baro}^2+dH_{true}^2$.

Figure 11:
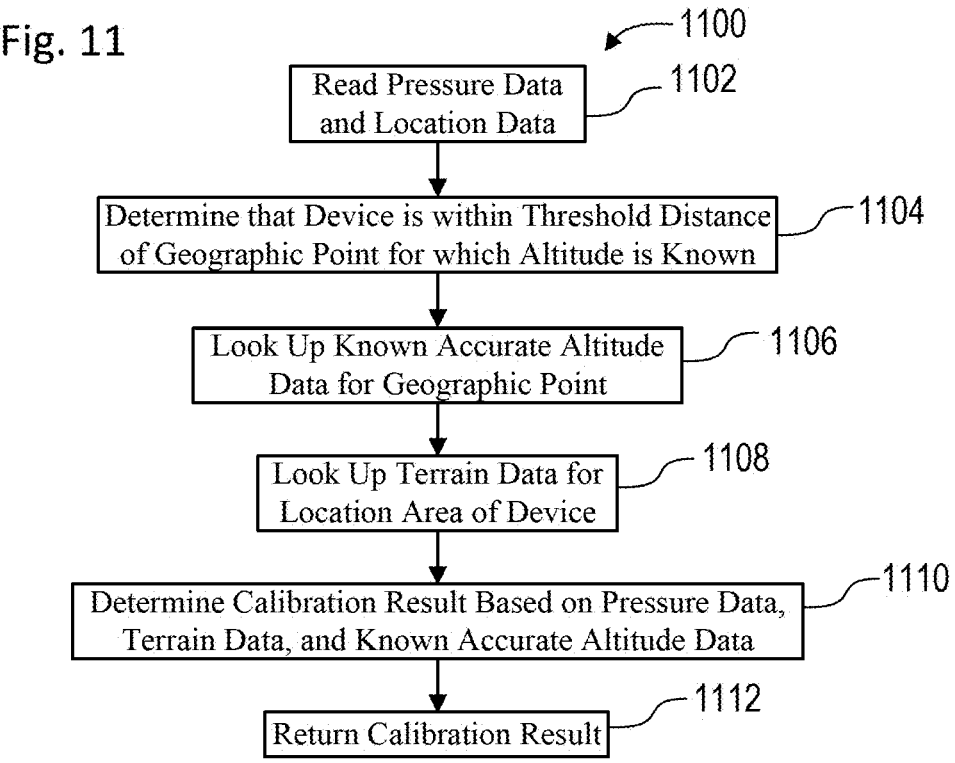
FIG. 11 is a simplified flowchart of an example process by the calibration system shown in FIG. 1 for performing another calibration technique, in accordance with some embodiments.

FIG. 11 shows a simplified flowchart of an example process 1100 by the calibration system 100 for performing the nearby known geographic point calibration technique 218 when this calibration technique is selected at 206 and performed at 226 in the example process 200 of FIG. 2 above, in accordance with some embodiments. At 1102, the server 102 reads the pressure data and location data from the data packet 114. At 1104, the server 102 determines that the user device 104 (and barometric pressure sensor 108) is within a threshold distance of a known geographic point. The known geographic point may be a POI or a Z Anchor Point (location where altitude Z is known) that is well surveyed. The known geographic point may alternatively be a wireless device, such as a Wi-Fi access point or a Bluetooth beacon that broadcasts a Z-position (altitude), in which case, the server 102 also reads the wireless data from the data packet. Thus, the proximity of the user device 104 to the known geographic point can be determined, for example, from a map or database that provides the locations of such geographic points. At 1106, the server 102 looks up known accurate altitude data for the geographic point, e.g., in the map or database. At 1108, the server 102 looks up the terrain data for the location area indicated by the location data for the user device 104 and the location of the known geographic point. At 1110, the server 102 determines the calibration result for this calibration technique based on the pressure data, the terrain data, and the known accurate altitude data. In some embodiments, the server 102 calculates a barometric based altitude of the user device 104 based on pressure data and the typical relationship between altitude differences and pressure differences. The server 102 then calculates the difference between the barometric based altitude and the known accurate altitude of the geographic point. The altitude difference, thus, provides the calibration offset for the calibration result based on the typical relationship between altitude differences and pressure differences. In some embodiments, the server 102 converts the known accurate altitude data into a calculated pressure value based on the typical relationship between altitude differences and pressure differences. Then the pressure difference between the calculated pressure value and the pressure data provides the calibration offset. Additionally, the terrain data in the area between or around the user device 104 and the known geographic point provides a potential variation in altitude between the user device 104 and the known geographic point. The variation in altitude is used to calculate the confidence interval, based on the typical relationship between altitude differences and pressure differences. For example, if the user device 104 is determined to be within 10 m of a monument (of known altitude) at a city park, and the terrain flatness metric around the user's 2D location area is 1 m 95% of the time (~12 Pa in pressure change), and if altitude of the monument were known to be 10 m height above ellipsoid (HAE) and the barometric based altitude were determined to be 15 m HAE, then the calibration offset would be 60 Pa ((15 m−10 m)×12 Pa/m), or −60 Pa depending on the sign convention of the calibration offset, and the confidence interval would be +/−12 Pa.

Figure 12:
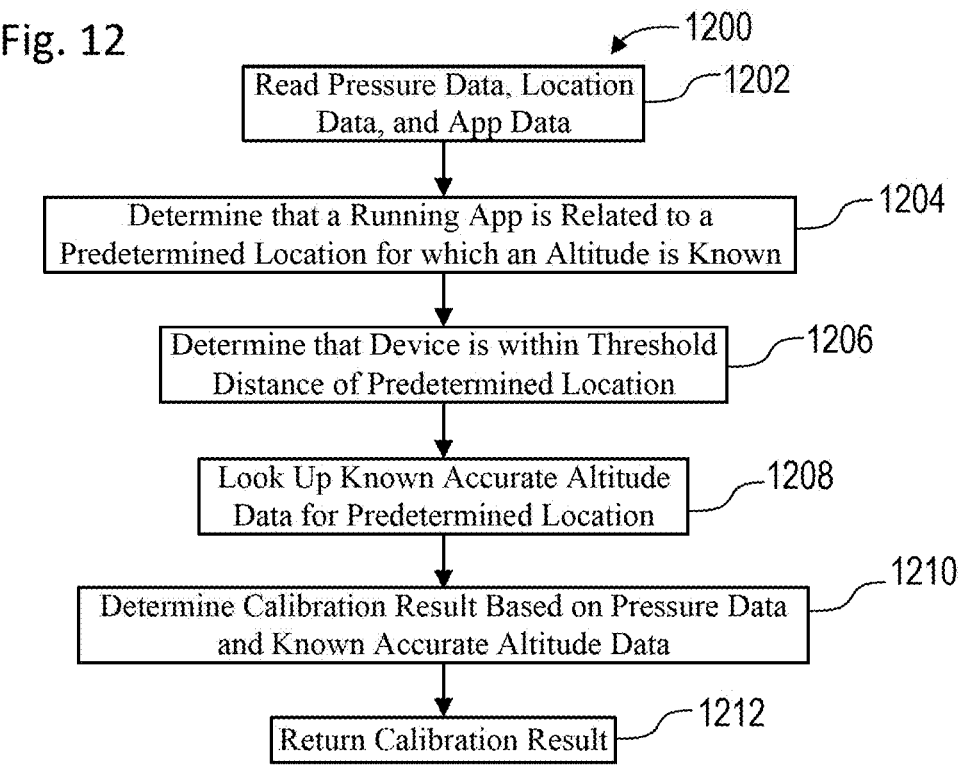
FIG. 12 is a simplified flowchart of an example process by the calibration system shown in FIG. 1 for performing another calibration technique, in accordance with some embodiments.

FIG. 12 shows a simplified flowchart of an example process 1200 by the calibration system 100 for performing the app context calibration technique 220 when this calibration technique is selected at 206 and performed at 226 in the example process 200 of FIG. 2 above, in accordance with some embodiments. At 1202, the server 102 reads the pressure data, the location data, and the app data from the data packet 114. The app data shows which apps were being run by the user device 104 at the time of data collection.

Some of these apps may be indicative of the underlying activity the user is doing, i.e., a location-specific app, which can potentially indicate the location of the user and thus the user device 104. For example, if the user device 104 is running an app that is related to a predetermined business enterprise, and if the business enterprise has offices or storefronts at predetermined locations, and if the location data indicates that the user device 104 is near one of these predetermined locations, then it is reasonable to assume that the user is engaged with the business enterprise at the predetermined location, which means that the altitude of the user device 104 is the same as the altitude of the predetermined location. Therefore, if there is a known accurate altitude of the predetermined location, then the barometric pressure sensor 108 can potentially be calibrated when the user device 104 is running the app for the business enterprise while near the predetermined location. At 1204, therefore, the server 102 analyses the app data and determines that a running app is related to a predetermined location of a business enterprise for which an altitude is known. At 1206, the server 102 determines that the user device 104 is within a threshold distance of the predetermined location. At 1208, the server 102 looks up the known accurate altitude data for the predetermined location in a database. At 1210, the server 102 determines the calibration result for this calibration technique based on the pressure data, the building and terrain data, and the known accurate altitude data in a manner similar to that for the building and terrain calibration technique 214 described above, since the app context calibration technique 220 may assume that the user device 104 is on the same floor as the predetermined location and that the floor is flat. (Alternatively, if the business enterprise occupies more than one floor at the predetermined location, then the app context calibration technique 220 takes this into consideration to determine the calibration offset and confidence interval in a manner similar to that of the building and terrain calibration technique 214 described above.) At 1212, the server 102 returns the calibration result to the example process 200 for further processing after 226. As an example of this calibration technique, if the user device 104 is running an app for a chain of retail stores, and if the location data indicates that the 2D location area of the user device 104 overlaps one of the retail stores of the chain, and if the retail store is known to be on the second floor in a shopping mall, then the server 102 determines that the user device 104 is also on the second floor of the shopping mall based on this information. On the other hand, if the user device 104 is running a driving directions app, then the user device 104 is most likely moving in a vehicle and not in a building, and the server 102 uses this information to constrain the location of the user device 104.

Figure 13:
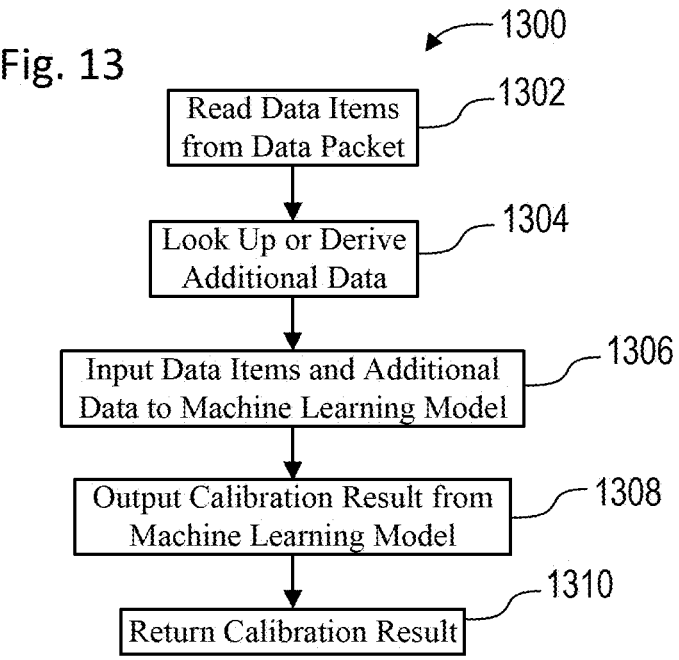
FIG. 13 is a simplified flowchart of an example process by the calibration system shown in FIG. 1 for performing another calibration technique, in accordance with some embodiments.

FIG. 13 shows a simplified flowchart of an example process 1300 by the calibration system 100 for performing the machine learning model calibration technique 222 when this calibration technique is selected at 206 and performed at 226 in the example process 200 of FIG. 2 above, in accordance with some embodiments. If enough data is collected and processed using any or all of the calibration techniques 208-220 described above, for calibration data that yields high-confidence calibration results, a supervised machine learning model can be trained to predict a calibration result for the calibration data of a receive data packet 114. The supervised machine learning model uses input parameters for data items for measurements such as the location data and pressure data. Additional data for input parameters include derived quantities, such as building overlap area with the 2D location area and the terrain flatness as quantified through variation of the terrain within the 2D location area. Using these input parameters and corresponding calibration results or calibration values for the user devices 104, a deep learning neural network is trained with all available data to a great degree of accuracy to produce the supervised machine learning model. The training phase yields a supervised machine learning model that is used to predict a calibration result when given the input parameters from a future data packet 114. The training and prediction steps of deep learning are supported by several available frameworks such as Tensorflow, Keras, Pytorch, Caffe2 and Theano. At 1302, therefore, the server 102 reads the data items for the input parameters from the data packet 114. At 1304, the server 102 looks up or derives additional data for the input parameters. At 1306, the server 102 inputs the data items and additional data to the supervised machine learning model. At 1308, the server 102 receives the calibration result output from the supervised machine learning model. At 1310, the server 102 returns the calibration result to the example process 200 for further processing after 226.

FIG. 14 is a simplified flowchart of an example process 1400 by the calibration system 100 for determining a combined calibration result at 308 in FIG. 3 by combining some or all of the previously determined calibration results 120, in accordance with some embodiments. The barometric pressure sensor 108 can be calibrated using any one of the calibration techniques described herein. Therefore, if there is only one calibration result in the historical calibration table 116 from having performed only one calibration technique 208-224 at this point, then this calibration result is simply accepted as the new calibration value in the process 300 above. However, the quality of any one calibration result can vary depending on the circumstances and environment. For example, a user device 104 in the middle of a skyscraper will have a very poor calibration if the calibration result based on the building and terrain calibration technique 214 were applied, but the user device 104 may have a very good calibration result if the barometric pressure sensor 108 therein had excellent accuracy under the barometric pressure sensor make and model calibration technique 208. Different algorithms for combining multiple calibration results, and their benefits, are disclosed herein. Additionally, different calibration results can be determined at different locations (e.g., one calibration at home, one calibration at work, etc.), at different times, or with different calibration techniques using the same data packet 114 (e.g. calibrating with a nearby sensor and calibrating within a building).

Accordingly, if the server 102 determines (at 1402) that there are multiple calibration results in the historical calibration table 116, then the server 102 determines (at 1404) weighting values corresponding to each of the calibration results, so that the multiple calibration results can be weighted and combined. At 1406, the server 102 adjusts or multiplies each calibration result with its corresponding weighting value to generate weighted calibration results. At 1408, the server 102 combines the weighted calibration results to obtain the combined calibration result.

For example, multiple calibration results can be equally weighted and then combined to form the combined calibration result: if the calibration offset of one calibration result is A0 and the calibration offset of another calibration result is A1, then the equally weighted combined calibration result is (A0+A1)/2. If the corresponding confidence interval to A0 is B0 and the corresponding confidence interval to A1 is B1, then the confidence intervals can be combined in quadrature: square root of $((B0^2+B1^2)/2)$. In another example, multiple calibration results with different weighting values can be combined: if one calibration offset is A0 with weight w0 and the other calibration offset is A1 with weight w1, then the weighted calibration offset is (A0*w0+A1*w1)/(w0+w1). If the corresponding confidence interval to A0 is B0 and the corresponding confidence interval to A1 is B1, then the weighted confidence interval can be determined in quadrature: square root of $((w0^2*B0^2+w1^2*B1^2)/(w0+w1))$. The combined calibration offset can be extended to N calibration results: (A0*w0+ . . . +AN*wN)/(w0+ . . . +wN), and the combined confidence interval can be similarly extended to N calibration results: square root of $((w0^2*B0^2+ \ldots +wN^2*BN^2)/(w0+ \ldots +wN))$.

Weighting values $w_i$ in this context can be based on corresponding confidence intervals $c_i$. In one example, the calibration result with the smallest confidence interval (non-negative value) could be weighted the most such as $w_i=1/c_i$ or $1/(1+c_i)$. In this context, confidence is defined as the range of possible calibration values to cover a given number of cases (e.g., 68% of all cases, 95% of all cases, etc.). With these functional forms of weighting values, calibration results with poor confidences can be de-weighted (i.e., have their weighting value decreased). Other weighting functions can be considered. In another example, the weighting values could be binary and the calibration result with the smallest confidence interval has a weighting value of 1, and all other weighting values are 0. In this case, the example process 1400 is simply selecting the best calibration result, instead of combining them. In another example, weighting values could be independent of confidence interval and be weighted based on the type of calibration technique (e.g., decrease the weighting value for the nearby known geographic point calibration technique 218 or the app context calibration technique 220 relative to the barometric pressure sensor make and model calibration technique 208 or the device make and model calibration technique 212). Priority of one calibration technique over another is generally determined empirically by comparing a relatively large number of calibration results from each of the calibration techniques 208-224 and determining which of the calibration techniques 208-224 perform better on average. Different types or models of the user devices 104 or of the barometric pressure sensor 108 or variations in the manner in which the calibration techniques 208-224 are performed can result in different orders for the priority of the calibration techniques 208-224. Additionally, in an ongoing data-gathering process, the priority order can potentially change over time. However, an example priority order is the following order from highest priority to lowest priority:

User Intervention Request
    Building and Terrain
    Barometric Pressure Sensor Make & Model
    Device Make & Model
    Nearby Accurate Sensor
    Device ID
    Nearby Known Geographic Point
    App Context
    Machine Learning Model As an alternative, a combined calibration value can be determined based on the overlap of the range of the calibration results. For example, if calibration result A0+/−B0 is 60 Pa+/−12 Pa and A 1+/−B1 is 50 Pa+/−10 Pa, then the overlapping calibration value is the overlap between 48-72 Pa and 40-60 Pa, i.e., 48-60 Pa, or 54 Pa+/−6 Pa.

At 1410, the server 102 returns the combined calibration result to the example process 300 for further processing after 308. For example, the combined calibration value can be included as one of the previously determined calibration results 120 or it can be used in place of one, some or all of the previously determined calibration results 120 in subsequent processing.

FIG. 15 shows a simplified flowchart of an example process 1500 by the calibration system 100 for filtering (in accordance with 228 in FIG. 2) a new calibration result as being acceptable for storing in the historical calibration table 116 and, if so, updating the historical calibration table 116 with the new calibration value, in accordance with some embodiments. (In some embodiments the process 1500 can also be used as part of the decision to update the current calibration table 118 between 310 and 312, as described above.) In general, the server 102 selects whether the new calibration value is acceptable in comparison relative to the current calibration value 122 and, if so, stores the new calibration value as one of the previously determined calibration results 120 in the historical calibration table 116. When a new calibration result is available, a decision must be made on whether to update the historical calibration table 116 with the new calibration result or to not update the historical calibration table 116. Depending on the current calibration offset A0, current confidence interval B0, new calibration offset A1 and new confidence interval B1, the server 102 accepts or rejects the new calibration result for storing in the historical calibration table 116.

Thus, at 1502, the server 102 determines that a new calibration result is available, i.e., one or more calibration techniques 208-224 have been performed and results have been produced. At 1504, the server 102 looks up the current calibration value 122 in the current calibration table 118. In some embodiments, at 1506, the server 102 compares the new calibration result to the current calibration value 122 and uses an appropriate rule for determining whether to accept or reject the new calibration result. In other embodiments, at 1506, the server 102 compares the new calibration result to the best one of the previously determined calibration results 120 in the historical calibration table 116 (instead of to the current calibration value 122), of the same calibration technique of the new calibration result, and uses the appropriate rule for determining whether to accept or reject the new calibration result. For example, in this situation, the "best" one of the previously determined calibration results 120 may be the one that has the smallest confidence interval or an average of the previously determined calibration results 120.

Figure 16:
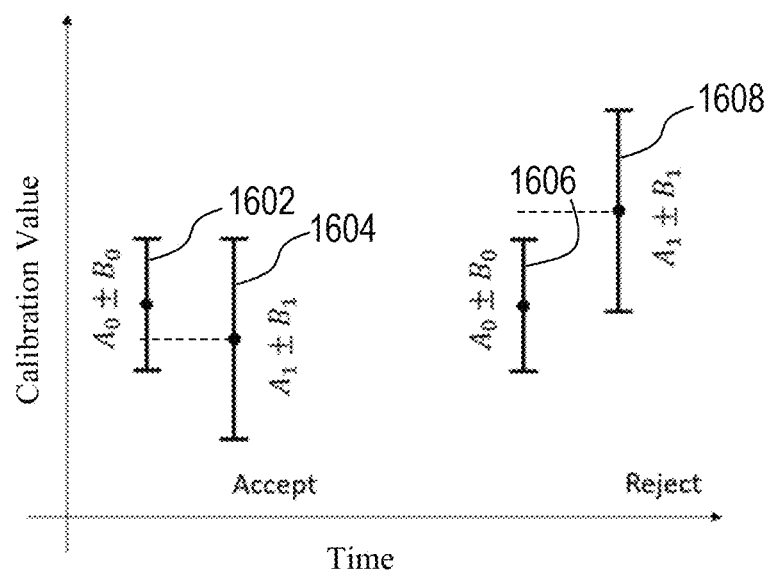
FIGS. 16-19 are alternative simplified graphs for use with the process shown in FIG. 15 for comparing a new calibration value with a current calibration value, in accordance with some embodiments.

According to a potential first rule, as illustrated by calibration value vs. time graphs 1602-1608 in FIG. 16, the new calibration result $(A_1+/−B_1)$ is accepted if the calibration offset thereof $A_1$ lies within the range of the current calibration value $A_0+/−B_0$. As illustrated by graphs 1602 and 1604, the new calibration offset $A_1$ (indicated by the center dot of graph 1604) lies within the range of the current calibration value $A_0+/−B_0$ (indicated by the dashed line intersecting the error bars of graph 1602). For the example of graphs 1602 and 1604, therefore, the first rule results in the server 102 accepting the new calibration result for storing in the historical calibration table 116. As illustrated by graphs 1606 and 1608, on the other hand, the new calibration offset $A_1$ (indicated by the center dot of graph 1608) lies outside the range of the current calibration value $A_0+/−B_0$ (indicated by the dashed line being outside the error bars of graph 1606). For the example of graphs 1606 and 1608, therefore, the first rule results in the server 102 rejecting the new calibration result for storing in the historical calibration table 116. The first rule is beneficial in a situation in which it is preferable not to allow for a dramatic change in the calibration value, so the new calibration result is not much different from the current calibration value. This is desirable if the calibration drift of the barometric pressure sensor 108 is known to be typically slow over a characteristic time period that is less than the time between subsequent measurements that trigger performance of the calibration techniques 208-224.

Figure 17:
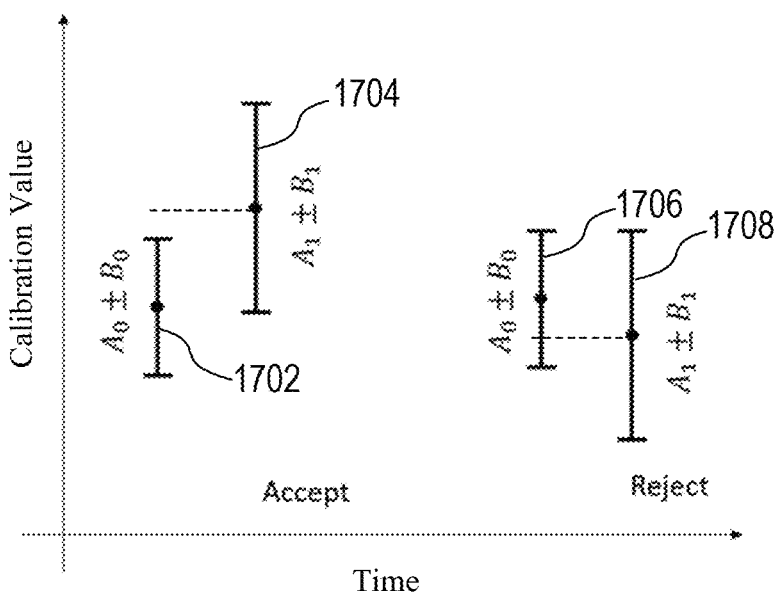

In contrast, according to a potential second rule, as illustrated by calibration value vs. time graphs 1702-1708 in FIG. 17, the new calibration result ($A_1+/-B_1$) is accepted if the calibration offset thereof $A_1$ lies outside the range of the current calibration value $A_0+/-B_0$. As illustrated by graphs 1702 and 1704, the new calibration offset $A_1$ (indicated by the center dot of graph 1704) lies outside the range of the current calibration value $A_0+/-B_0$ (indicated by the dashed line being outside the error bars of graph 1702). For the example of graphs 1702 and 1704, therefore, the second rule results in the server 102 accepting the new calibration result for storing in the historical calibration table 116. As illustrated by graphs 1706 and 1708, on the other hand, the new calibration offset $A_1$ (indicated by the center dot of graph 1708) lies within the range of the current calibration value $A_0+/-B_0$ (indicated by the dashed line intersecting the error bars of graph 1706). For the example of graphs 1706 and 1708, therefore, the second rule results in the server 102 rejecting the new calibration result for storing in the historical calibration table 116. The second rule is beneficial in a situation in which it is preferable to allow for a dramatic change in current calibration value, so the new calibration result is drastically different from the current calibration value. The second rule is preferable when is desirable to change to the new calibration result only if it has changed considerably from the current calibration value, such as if the new confidence interval $B_1$ happens to be larger than the current confidence interval $B_0$, or if the time between t1 (when the new calibration result was determined) and t0 (when the current calibration value was determined) exceeds an expected drift characteristic, or if the new calibration result ($A_1+/-B_1$) was calculated using a method with an unreliable 2D location area.

Figure 18:
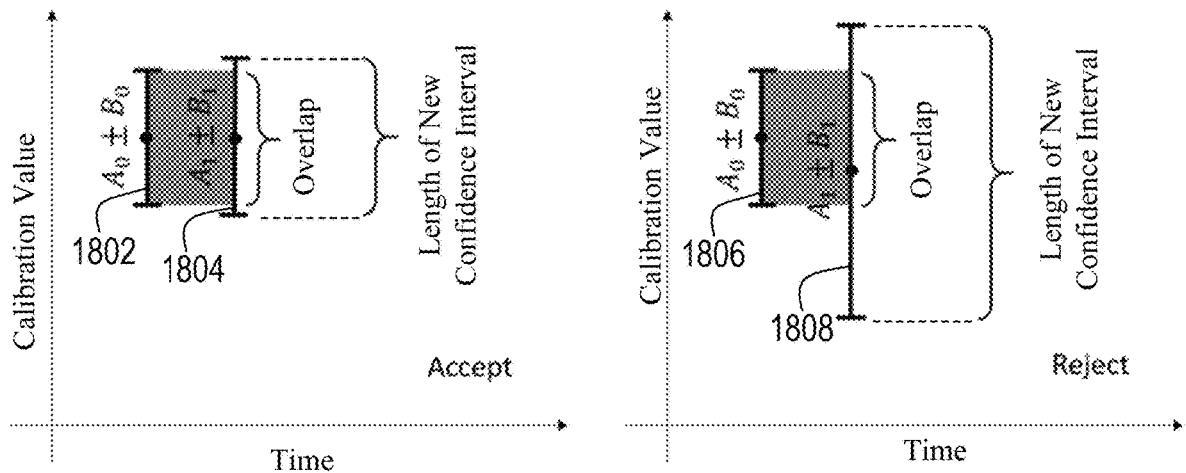

According to a potential third rule, as illustrated by calibration value vs. time graphs 1802-1808 in FIG. 18, the new calibration result ($A_1+/-B_1$) is accepted if the ratio of the overlap between the current calibration value ($A_0+/-B_0$) and the new calibration result ($A_1+/-B0$) to the length of the new confidence interval is greater than or equal to an overlap threshold (for example, 0.8). As illustrated by graphs 1802 and 1804, the ratio of the overlap (indicated by the shaded area between the graphs 1802 and 1804) to the length of the new confidence interval (indicated by the extent of the error bars for $A_1+/-B_1$) is relatively large, e.g., greater than 0.8. For the example of graphs 1802 and 1804, therefore, the third rule results in the server 102 accepting the new calibration result for storing in the historical calibration table 116. As illustrated by graphs 1806 and 1808, on the other hand, the ratio of the overlap (indicated by the shaded area between the graphs 1806 and 1808) to the length of the new confidence interval (indicated by the extent of the error bars for $A_1+/-B_1$) is relatively small, e.g., less than 0.8. For the example of graphs 1806 and 1808, therefore, the third rule results in the server 102 rejecting the new calibration result for storing in the historical calibration table 116. The third rule is beneficial in a situation in which it is preferable to change the current calibration value provided the confidence interval of the new calibration result is small relative to the overlap of the confidence intervals of the two calibration values (i.e., indicating a high confidence in the new calibration result).

Figure 19:
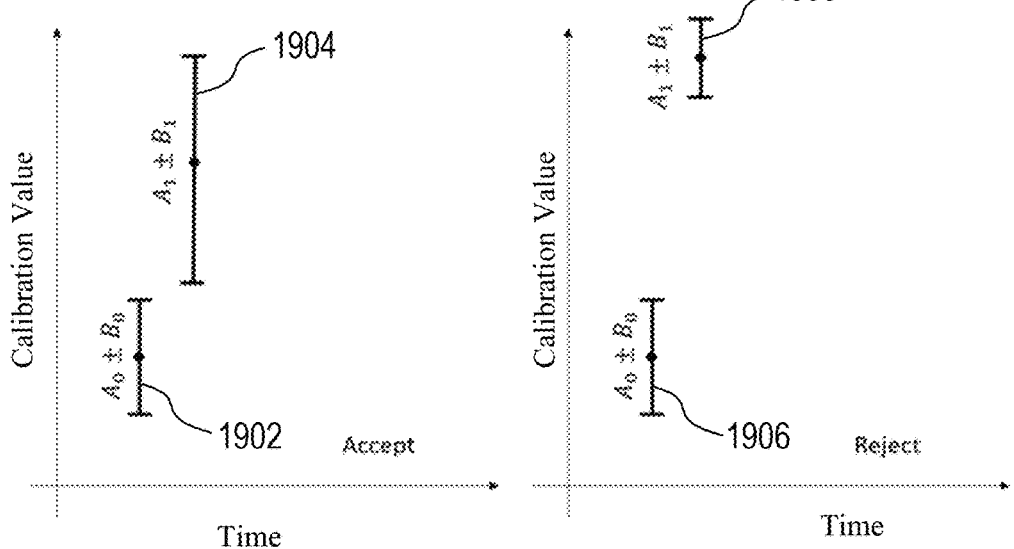

According to a potential fourth rule, as illustrated by calibration value vs. time graphs 1902-1908 in FIG. 19, the new calibration result ($A_1+/-B_1$) is accepted if the difference between the new calibration offset $A_1$ (indicated by the center dot of graph 1904) and the current calibration offset $A_0$ (indicated by the center dot of graph 1902) divided by the new confidence interval $B_1$ is less than or equal to a threshold, e.g., 2. As illustrated by graphs 1902 and 1904, the difference ($A_1-A_0$) divided by $B_1$ is less than 2. For the example of graphs 1902 and 1904, therefore, the fourth rule results in the server 102 accepting the new calibration result for storing in the historical calibration table 116. As illustrated by graphs 1906 and 1908, on the other hand, the difference ($A_1-A_0$) divided by $B_1$ is greater than 2. For the example of graphs 1906 and 1908, therefore, the fourth rule results in the server 102 rejecting the new calibration result for storing in the historical calibration table 116. The fourth rule is beneficial in a situation that allows for a change in the current calibration value when the new calibration result may have drifted beyond the current confidence interval without drifting too far.

According to a potential fifth rule, the new calibration result is accepted or rejected based on a comparison of the calibration techniques used to generate the new calibration result and the current calibration value. The fifth rule, thus, is not based on comparisons or calculations involving the calibration offsets or confidence intervals of the two calibration values. Instead, some types of the calibration techniques 208-224 may be prioritized over other types, since some calibration techniques can be more reliable than others. The reliability or prioritization of the calibration techniques 208-224 can be empirically determined by comparing a large number of calibration results with high-confidence results to determine which calibration technique typically perform better than others. The fifth rule is beneficial as it allows for selecting a calibration value that is considered to be more reliable or to have a higher confidence. For example, if the current calibration value ($A_0+/-B_0$) was determined using the app context calibration technique 220, and if the new calibration result ($A_1+/-B_1$) was determined using a well-surveyed POI with the nearby known geographic point calibration technique 218, and if the technique using a well-surveyed POI is prioritized over the app context calibration technique 220, then the server 102 will accept the new calibration result ($A_1+/-B_1$) for storing in the historical calibration table 116. In another example, if the current calibration value ($A_0+/-B_0$) was measured using the building and terrain calibration technique 214, and if the new calibration result ($A_1+/-B_1$) was measured using the user intervention request calibration technique 224, and the user intervention request calibration technique 224 is prioritized over the building and terrain calibration technique 214, then the server 102 will accept the new calibration result ($A_1+/-B_1$) for storing in the historical calibration table 116.

If the result of the comparison and determination at 1506 is to reject or not accept the new calibration result, as determined at 1508, then the server 102 (at 1510) does not update the historical calibration table with the new calibration result. On the other hand, if the result of the comparison and determination at 1506 is to accept the new calibration result, as determined at 1508, then the server 102 updates the historical calibration table 116 (at 1512) with the new calibration result by storing the new calibration result therein as one of the previously determined calibration results 120. The process 1500 then returns to process 200.

Many of the calibration techniques described herein assume that the 2D location of the user device 104 and the confidence thereof (e.g., as indicated by the 2D location area 708) provided in the location data are accurate. However, if the 2D location is determined to be unreliable, then any calibration result determined using the 2D position can be de-weighted when considering all possible calibration results with which it is combined. The underlying accuracy of the 2D location can be questioned based on several factors, such as:

1) morphology of the location, e.g., 2D location is known a priori to be difficult to determine in dense urban and urban environments;
2) usage of different 2D location sources, e.g., some user devices 104 determine location using a combination of sources such as a global navigation satellite system (GNSS), a Wi-Fi transmitter, etc., so accuracy of the location data can be determined by measuring location for each source and determining how well they correlate or are clustered;
3) stability of subsequent measurements, e.g., if subsequent 2D locations are considerably different, but it can be determined that the user device 104 remained still, then the 2D location may be unreliable;
4) for the app context calibration technique 220, the 2D location may be unreliable if the user device 104 is performing a task using a location-specific app, such as paying with a retail store app, but the nearest related retail store is far away from the user device 104 and outside the 2D location area;
5) if a prior calibration gives an unphysical result relative to a building envelope (e.g., outside the range of possible floors, far above the roof, or well below the basement), then the 2D location used in the prior calibration may have been unreliable, or the current 2D location may be unreliable; and
6) conflicting comparisons with different calibration techniques, e.g., if a calibration result determined not using the 2D location conflicts with a calibration result using the 2D location, then the user device 104 may be an outlier or the 2D location may be unreliable.

Any method, technique, process, approach or computation described or otherwise enabled by disclosure herein may be implemented by hardware components (e.g., machines), software modules (e.g., stored in machine-readable media), or a combination thereof. In particular, any method or technique described or otherwise enabled by disclosure herein may be implemented by any concrete and tangible system described herein. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media, including but not limited to one or more non-volatile or volatile storage media, removable or non-removable media, integrated circuit media, magnetic storage media, optical storage media, or any other storage media, including RAM, ROM, and EEPROM, that may be patented under the laws of the jurisdiction in which this application is filed, but does not include machine-readable media that cannot be patented under the laws of the jurisdiction in which this application is filed (e.g., transitory propagating signals). Methods disclosed herein provide sets of rules that are performed. Systems that include one or more machines and one or more non-transitory machine-readable media for implementing any method described herein are also contemplated herein. One or more machines that perform or implement, or are configured, operable or adapted to perform or implement operations comprising the steps of any methods described herein are also contemplated herein. Each method described herein that is not prior art represents a specific set of rules in a process flow that provides significant advantages in the fields of calibration and position location. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

An environment in which processes described herein may operate may include a network of terrestrial transmitters, at least one mobile device (e.g., user device), and a server. Each of the transmitters and the mobile device may be located at different altitudes or depths that are inside or outside various natural or manmade structures (e.g. buildings). Location or positioning signals may be respectively transmitted from the transmitters and satellites, and subsequently received by the mobile device using known transmission technologies. For example, the transmitters may transmit the signals using one or more common multiplexing parameters that utilize time slots, pseudorandom sequences, frequency offsets, or other approaches, as is known in the art or otherwise disclosed herein. The mobile device may take different forms, including a mobile phone or other wireless communication device, a portable computer, a navigation device, a tracking device, a receiver, or another suitable device that can receive the signals. Each transmitter and mobile device may include atmospheric sensors (e.g., a pressure and temperature sensors) for generating measurements of atmospheric conditions (e.g., pressure and temperature) that are used to estimate an unknown altitude of the mobile device. By way of example, a pressure sensor of the mobile device may also be calibrated from time to time.

By way of example, transmitters discussed herein may include: a mobile device interface for exchanging information with a mobile device (e.g., antenna(s) and RF front end components known in the art or otherwise disclosed herein); one or more processor(s); memory/data source for providing storage and retrieval of information and/or program instructions; atmospheric sensor(s) for measuring environmental conditions (e.g., pressure, temperature, humidity, other) at or near the transmitter; a server interface for exchanging information with a server (e.g., an antenna, a network interface, or other); and any other components known to one of ordinary skill in the art. The memory/data source may include memory storing software modules with executable instructions, and the processor(s) may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) may be integral with the transmitter, or separate from the transmitter and either co-located with the transmitter or located in the vicinity of the transmitter (e.g., within a threshold amount of distance).

Figure 20:
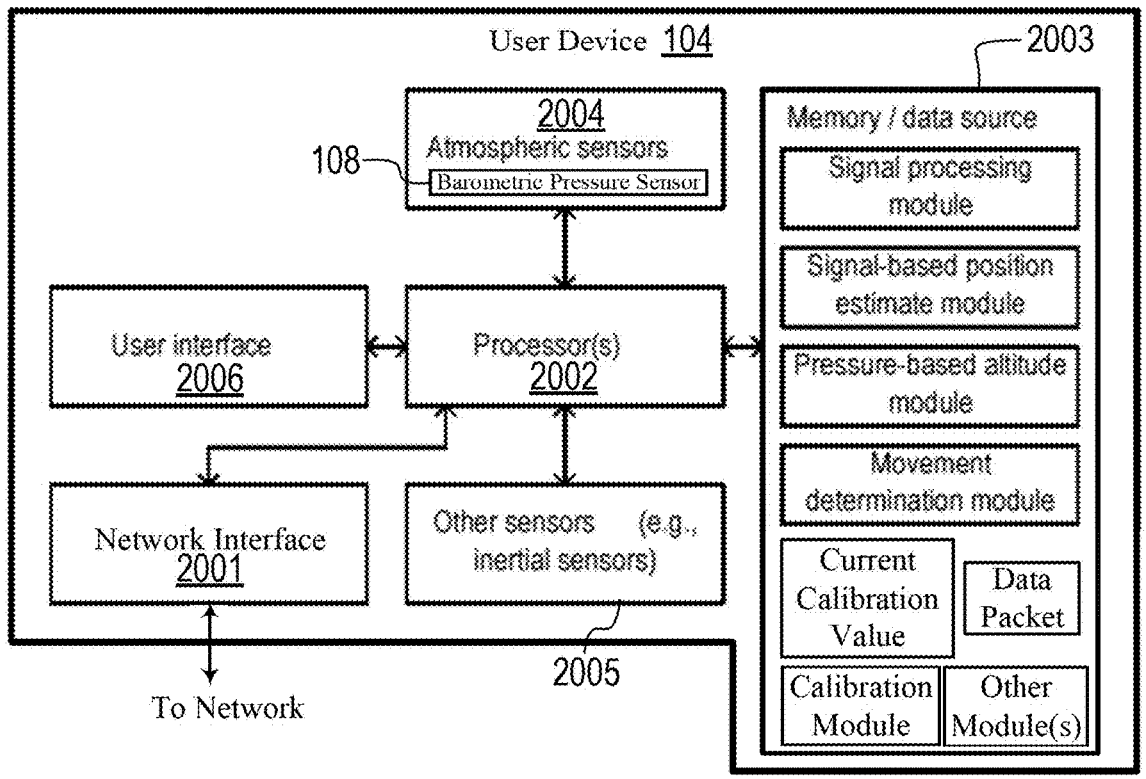
FIG. 20 is a simplified schematic diagram of a mobile or user device for use in the calibration system shown in FIG. 1, in accordance with some embodiments.

By way of example FIG. 20, the user device 104 may include a network interface 2001 for exchanging information with the server 102 via the network 106 (e.g., a wired and/or a wireless interface port, an antenna and RF front end components known in the art or otherwise disclosed herein); one or more processor(s) 2002; memory/data source 2003 for providing storage and retrieval of information and/or program instructions; atmospheric sensor(s) 2004 (including the barometric pressure sensor 108) for measuring environmental conditions (e.g., pressure, temperature, other) at the user device 104; other sensor(s) 2005 for measuring other conditions (e.g., compass and inertial sensors for measuring movement and orientation); a user interface 2006 (e.g., display, keyboard, microphone, speaker, other) for permitting a user of the user device 104 to provide inputs and receive outputs; and any other components known to one of ordinary skill in the art. A GNSS interface and processing unit (not shown) are contemplated, which may be integrated with other components or a standalone antenna, RF front end, and processors dedicated to receiving and processing GNSS signaling. The memory/data source 2003 may include memory storing data and software modules with executable instructions, including a signal processing module, a signal-based position estimate module, a pressure-based altitude module, a movement determination module, the current calibration value, the data packet, a calibration module, and other modules. The processor(s) 2002 may perform different actions by executing the instructions from the modules, including: (i) performance of part or all of the methods, processes and techniques as described herein or otherwise understood by one of ordinary skill in the art as being performable at the user device 104; (ii) estimation of an altitude of the user device 104 (based on measurements of pressure from the user device 104 and transmitter(s), temperature measurement(s) from the transmitter(s) or another source, and any other information needed for the computation); (iii) processing of received signals to determine position information or location data (e.g., times of arrival or travel time of the signals, pseudoranges between the mobile device and transmitters, transmitter atmospheric conditions, transmitter and/or locations or other transmitter information); (iv) use of position information to compute an estimated position of the user device 104; (v) determination of movement based on measurements from inertial sensors of the user device 104; (vi) GNSS signal processing; (vii) assembling and transmitting the data packet 112; (viii) storing the current calibration value 110 and data packet 112; (ix) calibrating the barometric pressure sensor 108; and/or (x) other processing as required by operations described in this disclosure.

Figure 21:
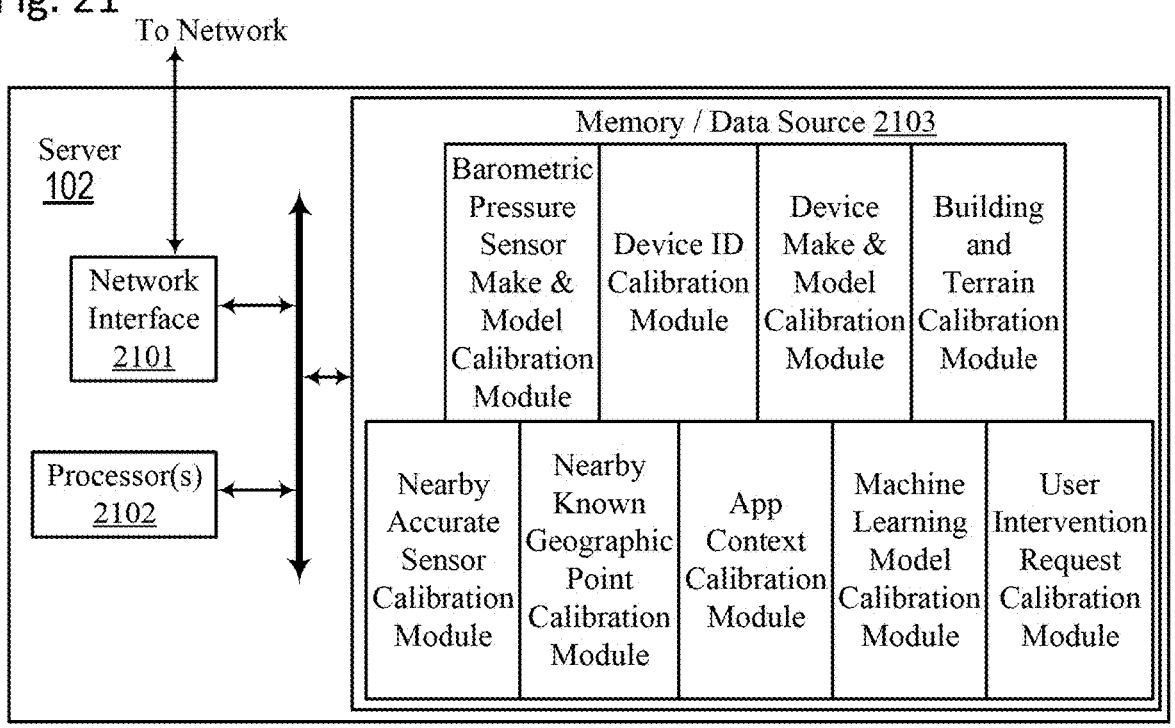
FIG. 21 is a simplified schematic diagram of a server for use in the calibration system shown in FIG. 1, in accordance with some embodiments.

By way of example FIG. 21, the server 102 may include: a network interface 2101 for exchanging information with the user device 104 and other sources of data via the network 106 (e.g., a wired and/or a wireless interface port, an antenna, or other); one or more processor(s) 2102; memory/data source 2103 for providing storage and retrieval of information and/or program instructions; and any other components known to one of ordinary skill in the art. The memory/data source 2103 may include memory storing software modules with executable instructions, such as barometric pressure sensor make and model calibration module, a device ID calibration module, a device make and model calibration module, a building and terrain calibration module, a nearby accurate sensor calibration module, a nearby known geographic point calibration module, an app context calibration module, a machine learning model calibration module, and a user intervention request calibration module, as well as other modules for each of the above described methods and processes. The processor(s) 2102 may perform different actions by executing instructions from the modules, including: (i) performance of part or all of the methods, processes and techniques as described herein or otherwise understood by one of ordinary skill in the art as being performable at the server 102; (ii) estimation of an altitude of the user device 104; (iii) computation of an estimated position of the user device 104; (iv) performance of calibration techniques; (v) calibration of the user device 104; or (vi) other processing as required by operations or processes described in this disclosure. Steps performed by servers as described herein may also be performed on other machines that are remote from the user device 104, including computers of enterprises or any other suitable machine.

Certain aspects disclosed herein relate to estimating the positions or locations of user devices—e.g., where the position is represented in terms of: latitude, longitude, and/or altitude coordinates; x, y, and/or z coordinates; angular coordinates; or other representations. Various techniques to estimate the position of a user device can be used, including trilateration, which is the process of using geometry to estimate the position of a user device using distances traveled by different "positioning" (or "ranging") signals that are received by the user device from different beacons (e.g., terrestrial transmitters and/or satellites). If position information like the transmission time and reception time of a positioning signal from a beacon are known, then the difference between those times multiplied by speed of light would provide an estimate of the distance traveled by that positioning signal from that beacon to the user device. Different estimated distances corresponding to different positioning signals from different beacons can be used along with position information like the locations of those beacons to estimate the position of the user device. Positioning systems and methods that estimate a position of a user device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. No. 9,057,606, issued Jun. 16, 2015. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

Determining the exact location (including altitude) of a user device in an environment can be quite challenging, especially when the user device is located in an urban environment or is located within a building. Imprecise estimates of the user device's altitude, for example, may have life or death consequences for the user of the user device since the imprecise altitude estimate can delay emergency personnel response times as they search for the user on multiple floors of a building. In less dire situations, imprecise altitude estimates can lead a user to the wrong area in an environment. Different approaches exist for estimating an altitude of a user device. In a barometric-based positioning system, altitude can be computed using a measurement of pressure from a calibrated pressure sensor of the user device along with ambient pressure measurement(s) from a network of calibrated reference pressure sensors and a measurement of ambient temperature from the network or other source. An estimate of an altitude of a user device ($h_{user}$) can be computed by the user device, a server, or another machine that receives needed information as follows:

$$h_{user} = h_{sensor} - \frac{RT_{remote}}{gM}\ln\left(\frac{P_{sensor}}{P_{user}}\right) \quad \text{Eqn 1}$$

where $P_{user}$ is the estimate of pressure at the location of the user device by a pressure sensor of the user device, $P_{sensor}$ is an estimate of pressure at the location of a reference pressure sensor that is accurate to within a tolerated amount of pressure from true pressure (e.g., less than 5 Pa), $T_{remote}$ is an estimate of temperature (e.g., in Kelvin) at the location of the reference pressure sensor or a different location of a remote temperature sensor, $h_{sensor}$ is an estimated altitude of the reference pressure sensor that is estimated to within a desired amount of altitude error (e.g., less than 1.0 meters), g corresponds to the acceleration due to gravity (e.g., −9.8 m/s$^2$), R is a gas constant, and M is molar mass of air (e.g., dry air or other). The minus sign (−) may be substituted with a plus sign (+) in alternative embodiments of Equation 1, as would be understood by one of ordinary skill in the art (e.g., for g=9.8 m/s$^2$).

The estimate of pressure at the location of the reference pressure sensor can be converted to an estimated reference-level pressure that corresponds to the reference pressure sensor in that it specifies an estimate of pressure at the latitude and longitude of the reference pressure sensor, but at a reference-level altitude that likely differs from the altitude of the reference pressure sensor. The reference-level pressure can be determined as follows:

$$P_{ref} = P_{sensor} \times \exp\left(-\frac{gM(h_{ref} - h_{sensor})}{RT_{remote}}\right) \quad \text{Eqn 2}$$

where $P_{sensor}$ is the estimate of pressure at the location of the reference pressure sensor, $P_{ref}$ is the reference-level pressure estimate, $T_{remote}$ is the reference ambient temperature, and $h_{ref}$ is the reference-level altitude. The altitude of the user device $h_{user}$ can be computed using Equation 1, where $h_{ref}$ is substituted for $h_{sensor}$ and $P_{ref}$ is substituted for $P_{sensor}$. The reference-level altitude $h_{ref}$ may be any altitude and is often set at mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate $P_{ref}$.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
    determining, by a server, a plurality of calibration results, each of the plurality of calibration results being for calibration of a barometric pressure sensor of a device, the device using a current calibration value for calibration of the barometric pressure sensor;
    selecting, by the server, a plurality of acceptable calibration results from the plurality of calibration results, wherein each acceptable calibration result of the plurality of acceptable calibration results satisfies a rule with respect to a relationship between the acceptable calibration result and the current calibration value;
    determining, by the server, a combined calibration result based on the plurality of acceptable calibration results; and calibrating the barometric pressure sensor using the combined calibration result as a new calibration value.

2. The method of claim 1, wherein:
each calibration result includes a calibration offset and a confidence interval;
the calibration offset is an amount by which a measured pressure value produced by the barometric pressure sensor is altered to generate a calibrated pressure value;
the confidence interval, when applied to the calibration offset, provides a potential error range of the calibration result; and
when applied to the calibrated pressure value, the confidence interval is a range greater than and less than the calibrated pressure value that an actual barometric pressure at the barometric pressure sensor is expected to be within.

3. The method of claim 2, wherein:
the rule with respect to the relationship between the acceptable calibration result and the current calibration value is based on the potential error range of the acceptable calibration result fully overlapping a previous potential error range of the current calibration value.

4. The method of claim 2, wherein:
the rule with respect to the relationship between the acceptable calibration result and the current calibration value is based on the calibration offset of the acceptable calibration result not being within a previous potential error range of the current calibration value.

5. The method of claim 2, further comprising:
determining, by the server, that the potential error range of the acceptable calibration result overlaps a previous potential error range of the current calibration value by an overlap amount;
wherein the rule with respect to the relationship between the acceptable calibration result and the current calibration value is based on a ratio of the overlap amount to the potential error range of the acceptable calibration result being greater than or equal to a threshold amount.

6. The method of claim 2, wherein:
the rule with respect to the relationship between the acceptable calibration result and the current calibration value is based on a difference between the calibration offset of the acceptable calibration result and the calibration offset of the current calibration value divided by the confidence interval of the acceptable calibration result being less than or equal to a threshold amount.

7. The method of claim 2, wherein:
the rule with respect to the relationship between the acceptable calibration result and the current calibration value is based on a first calibration technique of a plurality of calibration techniques used to determine the calibration result being prioritized higher than a second calibration technique of the plurality of calibration techniques used to determine the current calibration value.

8. The method of claim 1, further comprising:
before determining the combined calibration result, adjusting, by the server, the plurality of acceptable calibration results based on respective ages to obtain a plurality of adjusted acceptable calibration results; and
using the plurality of adjusted acceptable calibration results to determine the combined calibration result.

9. The method of claim 1, further comprising:
selecting, by the server, a selected calibration value from the combined calibration result and the current calibration value based on a selection criteria;

wherein:
the calibrating of the barometric pressure sensor uses the combined calibration result when the combined calibration result is selected as the selected calibration value and uses the current calibration value when the current calibration value is selected as the selected calibration value;
the selection criteria is based on 1) a smallest uncertainty of the combined calibration result and the current calibration value, 2) the smallest uncertainty of the combined calibration result and the current calibration value that is less than an uncertainty threshold value, 3) a highest priority calibration technique of a first calibration technique used to determine the combined calibration result and a second calibration technique used to determine the current calibration value, or 4) a median calibration value of the combined calibration result and the current calibration value.

10. The method of claim 1, wherein:
a plurality of calibration techniques uses a plurality of data items for determining the plurality of calibration results; and
each calibration result of the plurality of calibration results is determined by a different calibration technique of the plurality of calibration techniques.

11. The method of claim 10, wherein:
the plurality of data items includes 1) sensor characteristic data related to the barometric pressure sensor, and 2) current condition data related to conditions of the device at a time that calibration data for performing the plurality of calibration techniques was prepared by the device;
the sensor characteristic data includes 1) device identification data that uniquely identifies the device and with which a model type of the barometric pressure sensor can be identified, 2) sensor type data that identifies the model type of the barometric pressure sensor, and 3) device type data that identifies a model type of the device; and
the current condition data includes 1) pressure data indicative of a barometric pressure measurement performed by the barometric pressure sensor, 2) time data indicative of a time at which the barometric pressure sensor performed the barometric pressure measurement, 3) location data indicative of an area within which the device was located when the barometric pressure sensor performed the barometric pressure measurement, and 4) application data indicative of an application that was operative on the device when the barometric pressure sensor performed the barometric pressure measurement.

12. The method of claim 11, further comprising:
determining, by the server, a first calibration result of the plurality of calibration results based on a first predetermined calibration for the model type of the barometric pressure sensor;
determining, by the server, a second calibration result of the plurality of calibration results based on a second predetermined calibration for the model type of the device;
determining, by the server, a third calibration result of the plurality of calibration results based on the pressure data, the location data, and building and terrain data;
determining, by the server, a fourth calibration result of the plurality of calibration results based on the pressure data, the location data, the time data, and known accurate pressure data, the known accurate pressure data being from a known accurate barometric pressure sensor that is within a first threshold distance of the area within which the device was located;

determining, by the server, a fifth calibration result of the plurality of calibration results based on the pressure data, the location data, and known accurate altitude data, the known accurate altitude data being based on a geographic point for which an altitude thereof is known and which is within a second threshold distance of the area within which the device was located;

determining, by the server, a sixth calibration result of the plurality of calibration results based on the pressure data, the location data, and the application data, the application data indicating that the application that was operative on the device is related to a predetermined place for which an altitude is known and which is within a third threshold distance of the area within which the device was located; and determining, by the server, the new calibration value for the barometric pressure sensor based on two or more of the first calibration result, the second calibration result, the third calibration result, the fourth calibration result, the fifth calibration result and the sixth calibration result.

13. The method of claim 1, further comprising:
receiving, by the server from the device, a first data packet;
receiving, by the server from the device, a second data packet; and
selecting, by the server, a plurality of calibration techniques based on first data in the first data packet and second data in the second data packet.

14. The method of claim 13, further comprising:
determining, by the server, a first calibration result of the plurality of calibration results using the first data in the first data packet and a first calibration technique of the plurality of calibration techniques; and
determining, by the server, a second calibration result of the plurality of calibration results using the second data in the second data packet and a second calibration technique of the plurality of calibration techniques, the second calibration technique being different from the first calibration technique.

15. The method of claim 13, further comprising:
determining, by the server, a first calibration result of the plurality of calibration results using the first data in the first data packet and a calibration technique of the plurality of calibration techniques; and
determining, by the server, a second calibration result of the plurality of calibration results using the second data in the second data packet and the calibration technique.

16. A computerized system comprising:
a memory storing executable instructions; and
a processor, coupled to the memory, that performs a method by executing the instructions stored in the memory, the method comprising:
determining, by a server, a plurality of calibration results, each of the plurality of calibration results being for calibration of a barometric pressure sensor of a device, the device using a current calibration value for calibration of the barometric pressure sensor;
selecting, by the server, a plurality of acceptable calibration results from the plurality of calibration results, wherein each acceptable calibration result of the plurality of acceptable calibration results satisfies a rule with respect to a relationship between the acceptable calibration result and the current calibration value;

determining, by the server, a combined calibration result based on the plurality of acceptable calibration results; and calibrating the barometric pressure sensor using the combined calibration result as a new calibration value.

17. The computerized system of claim 16, wherein:
each calibration result includes a calibration offset and a confidence interval;
the calibration offset is an amount by which a measured pressure value produced by the barometric pressure sensor is altered to generate a calibrated pressure value;
the confidence interval, when applied to the calibration offset, provides a potential error range of the calibration result; and
when applied to the calibrated pressure value, the confidence interval is a range greater than and less than the calibrated pressure value that an actual barometric pressure at the barometric pressure sensor is expected to be within.

18. The computerized system of claim 17, wherein:
the rule with respect to the relationship between the acceptable calibration result and the current calibration value is based on the potential error range of the acceptable calibration result fully overlapping a previous potential error range of the current calibration value.

19. The computerized system of claim 17, wherein:
the rule with respect to the relationship between the acceptable calibration result and the current calibration value is based on the calibration offset of the acceptable calibration result not being within a previous potential error range of the current calibration value.

20. The computerized system of claim 17, wherein the method further comprises:
determining, by the server, that the potential error range of the acceptable calibration result overlaps a previous potential error range of the current calibration value by an overlap amount;
wherein the rule with respect to the relationship between the acceptable calibration result and the current calibration value is based on a ratio of the overlap amount to the potential error range of the acceptable calibration result being greater than or equal to a threshold amount.

21. The computerized system of claim 17, wherein: the rule with respect to the relationship between the acceptable calibration result and the current calibration value is based on a difference between the calibration offset of the acceptable calibration result and the calibration offset of the current calibration value divided by the confidence interval of the acceptable calibration result being less than or equal to a threshold amount" in order to provide appropriate antecedence basis ("a calibration offset" is already recited in claim 17).

22. The computerized system of claim 17, wherein:
the rule with respect to the relationship between the acceptable calibration result and the current calibration value is based on a first calibration technique of a plurality of calibration techniques used to determine the calibration result being prioritized higher than a second calibration technique of the plurality of calibration techniques used to determine the current calibration value.

23. The computerized system of claim 16, wherein the method further comprises:
before determining the combined calibration result, adjusting, by the server, the plurality of acceptable calibration results based on respective ages to obtain a plurality of adjusted acceptable calibration results; and using the plurality of adjusted acceptable calibration results to determine the combined calibration result.

24. The computerized system of claim 16, wherein the method further comprises:

selecting, by the server, a selected calibration value from the combined calibration result and the current calibration value based on a selection criteria;

wherein:

the calibrating of the barometric pressure sensor uses the combined calibration result when the combined calibration result is selected as the selected calibration value and uses the current calibration value when the current calibration value is selected as the selected calibration value;

the selection criteria is based on 1) a smallest uncertainty of the combined calibration result and the current calibration value, 2) the smallest uncertainty of the combined calibration result and the current calibration value that is less than an uncertainty threshold value, 3) a highest priority calibration technique of a first calibration technique used to determine the combined calibration result and a second calibration technique used to determine the current calibration value, or 4) a median calibration value of the combined calibration result and the current calibration value.

25. The computerized system of claim 16, wherein:

a plurality of calibration techniques uses a plurality of data items for determining the plurality of calibration results; and each calibration result of the plurality of calibration results is determined by a different calibration technique of the plurality of calibration techniques.

26. The computerized system of claim 25, wherein:

the plurality of data items includes 1) sensor characteristic data related to the barometric pressure sensor, and 2) current condition data related to conditions of the device at a time that calibration data for performing the plurality of calibration techniques was prepared by the device;

the sensor characteristic data includes 1) device identification data that uniquely identifies the device and with which a model type of the barometric pressure sensor can be identified, 2) sensor type data that identifies the model type of the barometric pressure sensor, and 3) device type data that identifies a model type of the device; and the current condition data includes 1) pressure data indicative of a barometric pressure measurement performed by the barometric pressure sensor, 2) time data indicative of a time at which the barometric pressure sensor performed the barometric pressure measurement, 3) location data indicative of an area within which the device was located when the barometric pressure sensor performed the barometric pressure measurement, and 4) application data indicative of an application that was operative on the device when the barometric pressure sensor performed the barometric pressure measurement.

27. The computerized system of claim 26, wherein the method further comprises:

determining, by the server, a first calibration result of the plurality of calibration results based on a first predetermined calibration for the model type of the barometric pressure sensor;

determining, by the server, a second calibration result of the plurality of calibration results based on a second predetermined calibration for the model type of the device;

determining, by the server, a third calibration result of the plurality of calibration results based on the pressure data, the location data, and building and terrain data;

determining, by the server, a fourth calibration result of the plurality of calibration results based on the pressure data, the location data, the time data, and known accurate pressure data, the known accurate pressure data being from a known accurate barometric pressure sensor that is within a first threshold distance of the area within which the device was located;

determining, by the server, a fifth calibration result of the plurality of calibration results based on the pressure data, the location data, and known accurate altitude data, the known accurate altitude data being based on a geographic point for which an altitude thereof is known and which is within a second threshold distance of the area within which the device was located;

determining, by the server, a sixth calibration result of the plurality of calibration results based on the pressure data, the location data, and the application data, the application data indicating that the application that was operative on the device is related to a predetermined place for which an altitude is known and which is within a third threshold distance of the area within which the device was located; and determining, by the server, the new calibration value for the barometric pressure sensor based on two or more of the first calibration result, the second calibration result, the third calibration result, the fourth calibration result, the fifth calibration result and the sixth calibration result.

28. The computerized system of claim 16, wherein the method further comprises:

receiving, by the server from the device, a first data packet;

receiving, by the server from the device, a second data packet; and selecting, by the server, a plurality of calibration techniques based on first data in the first data packet and second data in the second data packet.

29. The computerized system of claim 28, wherein the method further comprises:

determining, by the server, a first calibration result of the plurality of calibration results using the first data in the first data packet and a first calibration technique of the plurality of calibration techniques; and determining, by the server, a second calibration result of the plurality of calibration results using the second data in the second data packet and a second calibration technique of the plurality of calibration techniques, the second calibration technique being different from the first calibration technique.

30. The computerized system of claim 28, wherein the method further comprises:

determining, by the server, a first calibration result of the plurality of calibration results using the first data in the first data packet and a calibration technique of the plurality of calibration techniques; and determining, by the server, a second calibration result of the plurality of calibration results using the second data in the second data packet and the calibration technique.

* * * * *